(12) United States Patent
Birgeoglu et al.

(10) Patent No.: US 9,600,026 B2
(45) Date of Patent: Mar. 21, 2017

(54) INTERACTIVE KIOSK SYSTEMS AND METHODS FOR THEIR MANUFACTURE

(71) Applicant: Zivelo Inc., Scottsdale, AZ (US)

(72) Inventors: Zubair Birgeoglu, Scottsdale, AZ (US); John Kucera, Scottsdale, AZ (US)

(73) Assignee: Zivelo Inc., Scottsdale, AZ (US)

( * ) Notice: Subject to any disclaimer, the term of this patent is extended or adjusted under 35 U.S.C. 154(b) by 0 days.

(21) Appl. No.: 14/799,491

(22) Filed: Jul. 14, 2015

(65) Prior Publication Data

US 2017/0017263 A1     Jan. 19, 2017

(51) Int. Cl.
*G06F 1/16* (2006.01)
*G06F 1/18* (2006.01)

(52) U.S. Cl.
CPC ............ *G06F 1/1601* (2013.01); *G06F 1/181* (2013.01)

(58) Field of Classification Search
CPC .... G06F 1/1601; G06F 1/1647; G06F 1/1649; G06F 2200/1612; G06F 3/0482; G06F 1/181; G07F 19/20; G07F 19/205; G07F 19/201; G06Q 20/1085; G06Q 40/00
USPC ............ 361/679.21, 679.22, 679.27, 679.26
See application file for complete search history.

(56) References Cited

U.S. PATENT DOCUMENTS

| | | |
|---|---|---|
| D327,766 S | 7/1992 | Swaine et al. |
| D350,566 S | 9/1994 | Pearson |
| D357,495 S | 4/1995 | Skaggs et al. |
| D360,764 S | 8/1995 | Collins |
| D377,012 S | 12/1996 | Oslund |
| D377,784 S | 2/1997 | Wilson |
| D378,082 S | 2/1997 | Wilson |
| D389,522 S | 1/1998 | Hesselbach et al. |
| D397,562 S | 9/1998 | DePottey et al. |
| D403,670 S | 1/1999 | Liao |
| D415,330 S | 10/1999 | King |
| D417,440 S | 12/1999 | Wilson |
| D417,893 S | 12/1999 | Hunter et al. |
| D436,999 S | 1/2001 | Cronley |
| D442,560 S | 5/2001 | Price et al. |
| D468,134 S | 1/2003 | Oikawa |
| D473,554 S | 4/2003 | Landerholm et al. |
| 6,595,852 B2 | 7/2003 | Wang |
| D493,816 S | 8/2004 | Butler |
| D503,120 S | 3/2005 | Sato et al. |
| D504,892 S | 5/2005 | Chen et al. |
| D518,480 S | 4/2006 | Zheng et al. |
| 7,321,387 B2 | 1/2008 | Novais et al. |
| D585,943 S | 2/2009 | Pymm et al. |
| D587,296 S | 2/2009 | Kuramochi |

(Continued)

OTHER PUBLICATIONS

Zivelo Solutions Corporate Brochure, 24pgs., Fall 2014.
Zivelo Sales Presentation, 31pgs., Fall 2014.

*Primary Examiner* — Anthony Haughton
*Assistant Examiner* — Ingrid Wright
(74) *Attorney, Agent, or Firm* — Jennings Strouss & Salmon PLC; Michael K. Kelly

(57) ABSTRACT

Systems, devices, and methods for updating a kiosk include removing a first face plate, having a first opening, from a sub-chassis; removing a first display, having a first size corresponding to the first opening, from the sub-chassis; securing a second display, having a second size, to the sub-chassis; and attaching a second face plate to the sub-chassis, the second face plate having a second opening corresponding to the second display.

10 Claims, 36 Drawing Sheets

(56) References Cited

U.S. PATENT DOCUMENTS

| | | |
|---|---|---|
| D587,700 S | 3/2009 | Corti et al. |
| D590,387 S | 4/2009 | Chen |
| D594,068 S | 6/2009 | Hsu |
| D605,189 S | 12/2009 | Kuroda |
| 7,728,885 B2 | 6/2010 | van Schalkwyk |
| D621,513 S | 8/2010 | Cinqualbre |
| D627,397 S | 11/2010 | Horn et al. |
| 7,885,522 B2 | 2/2011 | Gassman et al. |
| D637,595 S | 5/2011 | Mizusugi |
| D639,800 S | 6/2011 | Magruder |
| D646,269 S | 10/2011 | Crick, Jr. et al. |
| D648,818 S | 11/2011 | Zalar |
| D653,835 S | 2/2012 | Strempack et al. |
| D661,124 S | 6/2012 | Cubbun et al. |
| D661,291 S | 6/2012 | Renukanand et al. |
| D661,292 S | 6/2012 | Kuroda et al. |
| D661,293 S | 6/2012 | Kuroda et al. |
| D662,329 S | 6/2012 | Arko et al. |
| D665,555 S | 8/2012 | Lee et al. |
| D669,464 S | 10/2012 | Birgeoglu |
| D669,891 S | 10/2012 | Bowles et al. |
| 8,317,088 B2 | 11/2012 | Yoneda |
| D675,608 S | 2/2013 | Ono |
| D675,610 S | 2/2013 | Ono |
| D676,038 S | 2/2013 | Masuda et al. |
| 8,365,868 B2 | 2/2013 | Johnson et al. |
| D681,639 S | 5/2013 | Cruz et al. |
| D692,885 S | 11/2013 | Cruz |
| D695,285 S | 12/2013 | Smith et al. |
| D697,062 S | 1/2014 | Nagai et al. |
| D702,675 S | 4/2014 | Jones |
| D702,676 S | 4/2014 | Smith et al. |
| D705,213 S | 5/2014 | Smith et al. |
| D707,674 S | 6/2014 | Daniel |
| D707,676 S | 6/2014 | Azuma |
| D707,677 S | 6/2014 | Azuma |
| D708,459 S | 7/2014 | Heirakuji et al. |
| D709,952 S | 7/2014 | Logan et al. |
| D711,472 S | 8/2014 | Rotelli, III et al. |
| D721,695 S | 1/2015 | Birgeoglu |
| D721,696 S | 1/2015 | Birgeoglu |
| D722,313 S | 2/2015 | Birgeoglu |
| D723,025 S | 2/2015 | Birgeoglu |
| D723,026 S | 2/2015 | Birgeoglu |
| 2001/0011262 A1 | 8/2001 | Hoyt et al. |
| 2002/0124271 A1 | 9/2002 | Herrmann et al. |
| 2005/0211768 A1 | 9/2005 | Stillman |
| 2007/0143341 A1 | 6/2007 | Brownell et al. |
| 2007/0253684 A1 | 11/2007 | Ryckman |
| 2008/0040227 A1 | 2/2008 | Ostermann et al. |
| 2008/0168807 A1 | 7/2008 | Dion et al. |
| 2009/0154889 A1 | 6/2009 | Ryckman |
| 2012/0011540 A1 | 1/2012 | Pulford |
| 2012/0059727 A1 | 3/2012 | Dameron et al. |
| 2014/0172602 A1* | 6/2014 | Beddow ............... G06Q 20/18 705/21 |

* cited by examiner

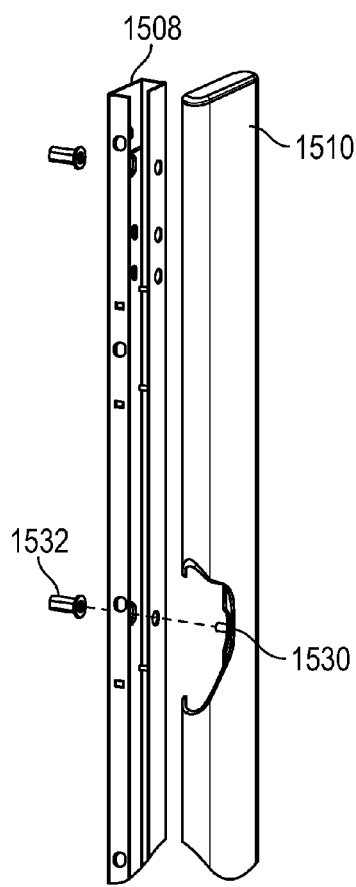
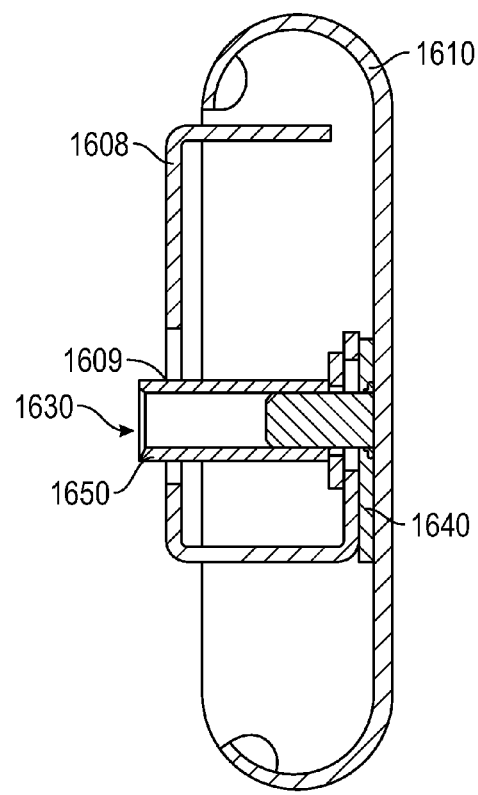
FIG. 15
FIG. 16

INTERACTIVE KIOSK SYSTEMS AND METHODS FOR THEIR MANUFACTURE

TECHNICAL FIELD

The present invention relates, generally, to kiosks and kiosk systems and, more particularly, to improved methods for their manufacture and maintenance.

BRIEF SUMMARY

Various embodiments of the present invention relate to improved kiosks and methods for their manufacture.

Other embodiments provide systems and methods for future proofing kiosks to reduce their total cost of ownership.

Other embodiments provide structures for stiffening a main chassis against torsional forces.

Other embodiments provide counter top mounting structures and methods.

Various other embodiments, aspects and features are of the present invention are described in more detail below. Additional features and characteristics will become apparent from the subsequent detailed description and the appended claims, taken in conjunction with the accompanying drawings and this background section.

BRIEF DESCRIPTION OF THE DRAWING FIGURES

Exemplary embodiments will hereinafter be described in conjunction with the following drawing figures, wherein like numerals denote like elements, and:

FIGS. 14-16 illustrate the assembly of blades onto a kiosk sub-structure in accordance with exemplary embodiments of the present invention;

DETAILED DESCRIPTION OF PREFERRED EXEMPLARY EMBODIMENTS

The following detailed description is merely exemplary in nature and is not intended to limit the invention or the application and uses of the invention. Furthermore, there is no intention to be bound by any theory presented in the preceding background or the following detailed description.

Various embodiments of the following discussion relate to individual kiosks, while other embodiments relate to groups of kiosks deployed in a commercial establishment, such as a fast food restaurant. For example, a group of kiosks may be configured to provide a consistent customer experience across a variety of kiosk platforms. By way of non-limiting example, a consistent customer experience may entail employing both functional and visual features which reinforce customer loyalty. In this regard, the ability to present a consistent look and feel across diverse kiosk platforms may be facilitated by utilitarian features, such as the ability to interchange and replace physical components of the kiosks to refresh the visual appearance, or to repair or upgrade components. Exemplary replaceable components may include vertical side blades or circumferential rings.

Other embodiments relate to "future proofing" a kiosk, also referred to as obsolescence mitigation, whereby structures are built into a kiosk to allow the efficient replacement of display screens (e.g., to upgrade technology) and other components, thereby reducing the long term cost of ownership of a kiosk.

Other embodiments involve a two sided kiosk, with a central chassis therebetween. The central chassis is constructed in a manner which reduces or prevents twisting through the use of intelligently placed reinforcement structures, without compromising the sleek profile of the kiosk.

Other embodiments relate to a chassis and face plate design which prevents the introduction of liquid (e.g., rain, spilled beverages) into the top of the kiosk, while allowing airflow through the kiosk without the need for perforations on the outside surface.

Other embodiments relate to various techniques for mounting kiosks, such as pole mounted, free standing, counter top mounts, wall mount, table top, and pedestal configurations.

Other embodiments relate to cascading multiple displays together in a uni-enclosure or matting, and further circumscribed by a replaceable circumferential ring.

Figure 1:
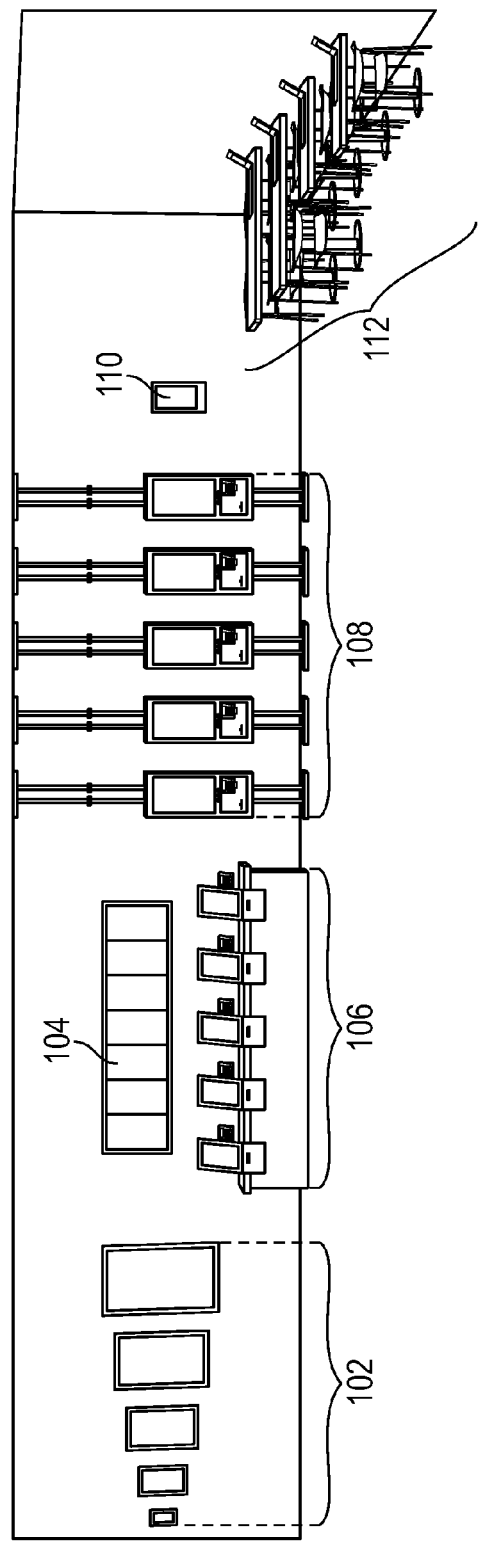
FIG. 1 is a schematic view of a commercial establishment including various embodiments of kiosks exhibiting a visually pleasing and consistent look and feel, facilitated by utilitarian structures and functions for configuring and refreshing the devices in accordance with exemplary embodiments of the present invention.

Referring now to FIG. 1, an exemplary retail (e.g. restaurant) environment 100 may include one or more wall mounted digital signs 102, a block menu 104, one or more counter mounted devices 106, one or more pole mounted devices 108, one or more customer loyalty devices 110, and one or more kiosk tables 112. The foregoing kiosk platforms, and their associated features and functions, are described in greater detail below. It should be noted, however, that each of the foregoing models contributes to an overall consistent customer experience including both the functional and aesthetic attributes of the devices. Moreover, many of the distinctive aesthetic features are enabled and/or implemented as a result of structural and functional features, as also described in greater detail below. In addition, the foregoing models share similar attributes from the perspective of the person or entity that purchases, installs, and/or maintains the kiosks, such as various structural features designed to reduce the long term cost of ownership by streamlining the replacement, upgrading, refreshing, repair, and maintenance of the devices.

Figure 2:
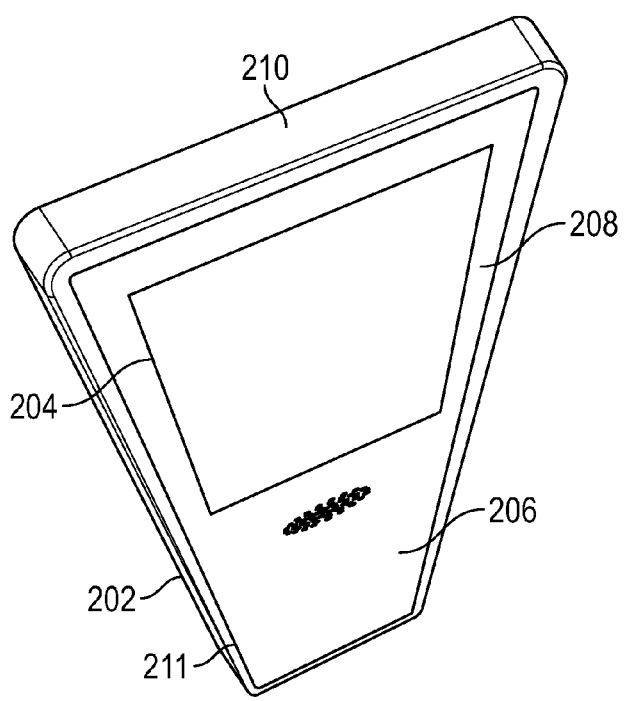
FIGS. 2 and 3 are free standing versions of a kiosk in accordance with exemplary embodiments of the present invention.
Figure 3:
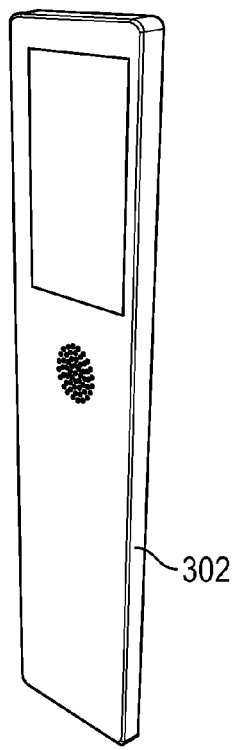

FIG. 2 is a front perspective view of a free standing, free standing kiosk 202, and FIG. 3 is a side perspective view of a kiosk 302, highlighting the sleek, elegant character of the device. In one embodiment, the device 202 includes a display 204 (which may or may not include a touch or otherwise interactive screen), a speaker and/or microphone module 206, a face plate, skin, or matting 208 substantially enclosing the display 204, and a ring 210 extending about the outside border of the device, including a front lip portion 211.

Figure 4:
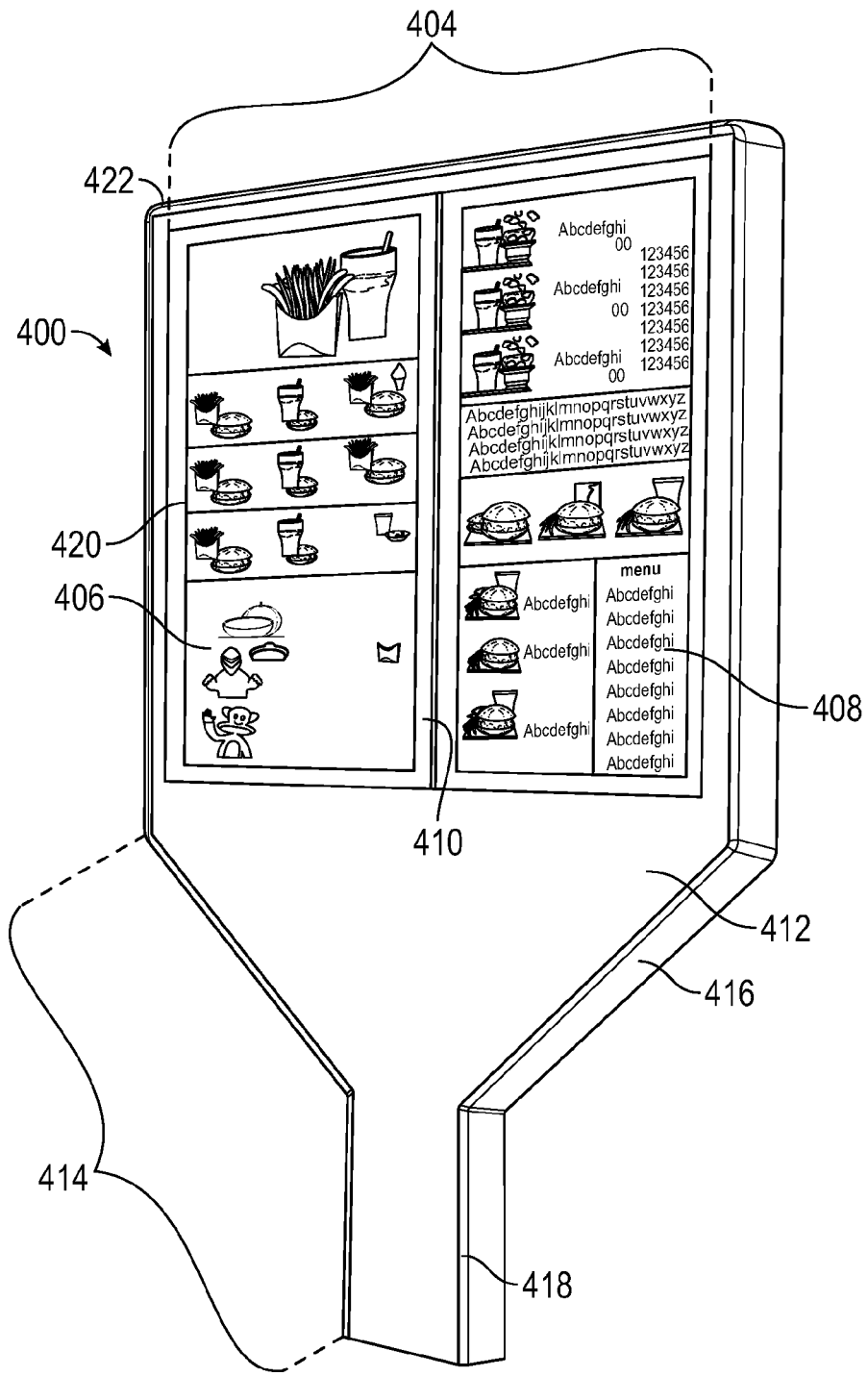
FIGS. 4 and 5 are pedestal versions of a kiosk in accordance with exemplary embodiments of the present invention.

FIG. 4 is a perspective view of an outdoor drive thru menu 402 including a display region 404 having a first display device 406 and a second display device 408 separated by a vanishingly thin space 410 between the displays. The displays may comprise any suitable bezel-less, narrow bezel, or near bezel-less technology such as, for example, model number TH-55LFV50 ultra-narrow bezel 55' LCD display available from Panasonic™. The kiosk 404 further comprises a mount 414 including a pedestal 418 and a flared region 416, which may fare at a suitable angle with respect to the pedestal 418 in order to accommodate any number of adjacent displays (two, in the illustrated example). The Kiosk 404 may also include a speaker and/or microphone (and/or camera/motion detector) 412, a skin 420, and a ring 422.

Figure 5:
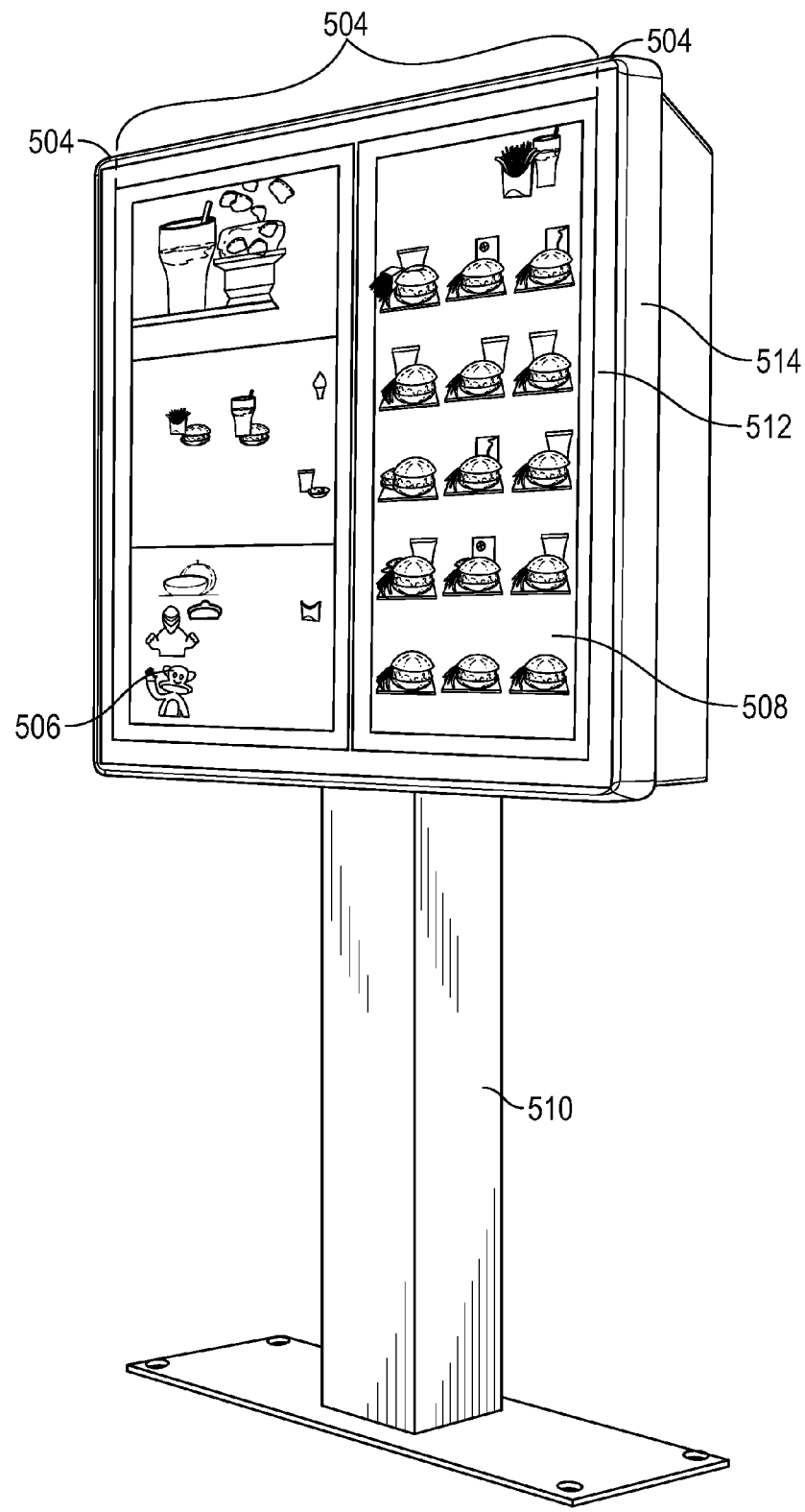

FIG. 5 is an alternate embodiment of a drive thru menu 500 including a display region 504 having a first display 506 and a second display 508, mounted on a rectangular mount 510. The kiosk 500 includes the distinctive matting (face plate/skin) 512 enclosing the display region, bounded by a ring structure 514.

Figures 6, 7:
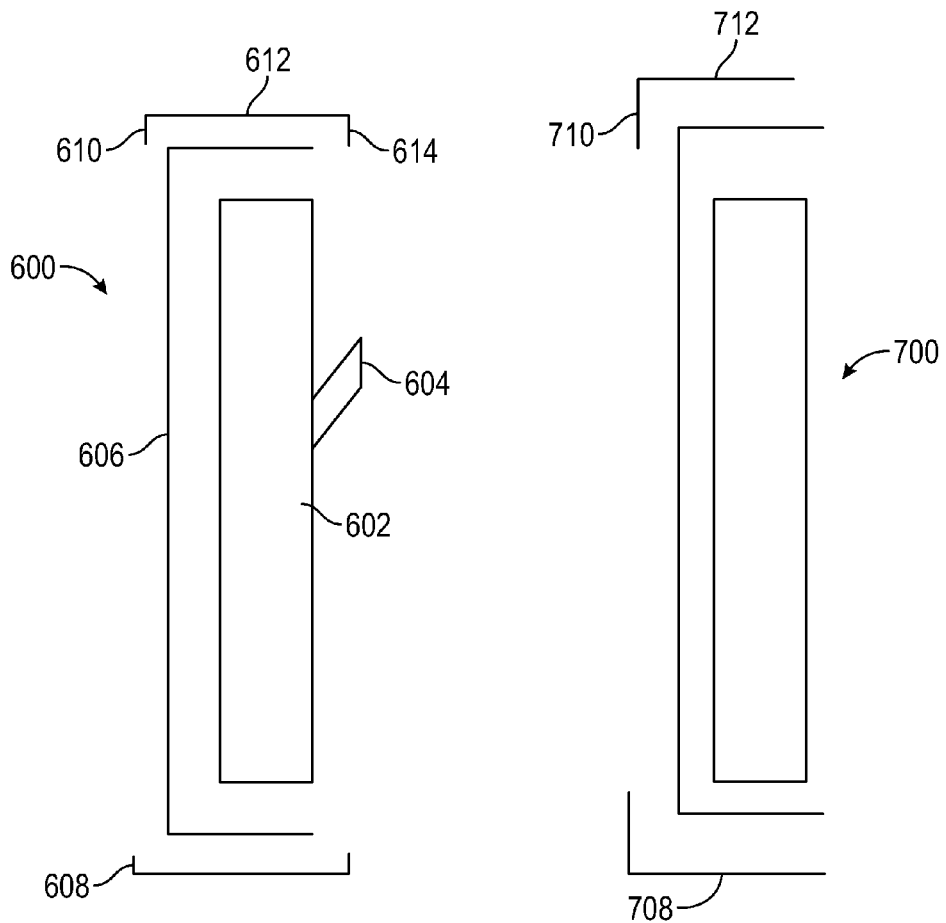
FIGS. 6 and 7 are schematic views of a wall mounted kiosk in accordance with exemplary embodiments of the present invention.

FIG. 6 is a section view of a wall mounted kiosk 600 taken along line VI-VI of FIG. 1 illustrating, in cross-section, a display 602, a bracket 604 configured to mount the display (s) to a wall, a face plate 606 enclosing the display(s), and a ring 608 including an edge portion 612, a front facing lip portion 610, and an optional rear facing lip portion 614. FIG. 7 shows an alternate embodiment of the assembly of FIG. 6, wherein the ring 708 includes an edge portion 712 and a front lip 710, but does not include an analogous rear lip portion.

Figure 8:
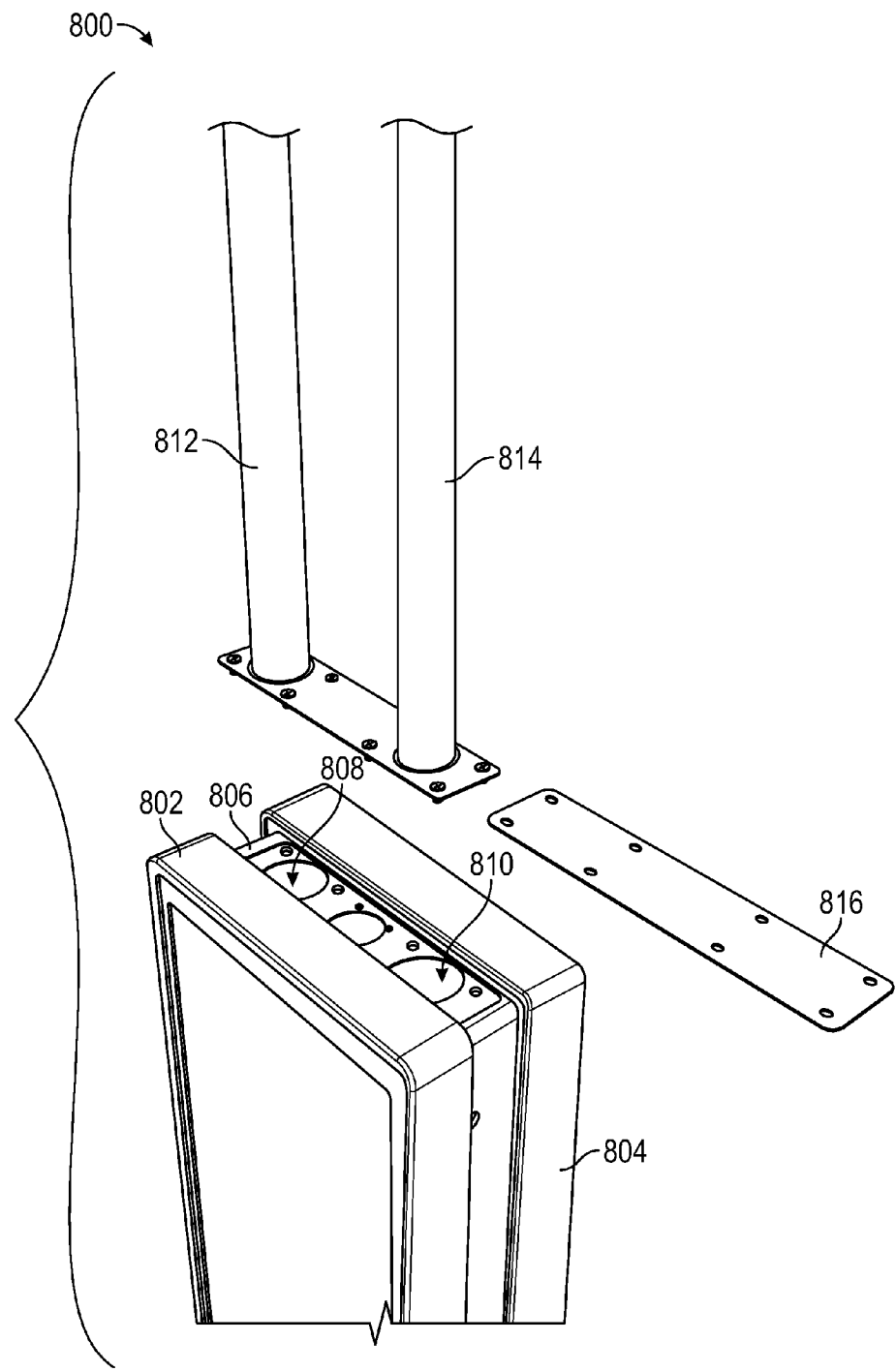
FIGS. 8 and 9 are pole mounted kiosks in accordance with exemplary embodiments of the present invention.

FIG. 8 is a top perspective view of a two sided, pole mounted kiosk assembly 800 including a first kiosk 802, a second kiosk 804, and a center chassis or cabinet 806 sandwiched between the first and second kiosks. The top of the main chassis includes openings 808 and 810 corresponding to poles 812 and 814, respectively. In a first embodiment, high voltage power lines (not shown) extend along the inside of the pole 812 and the opening 808, and low voltage data lines (not shown) extend along the inside of the pole 814 and the opening 810. The poles may be configured to extend upwardly and mount to a ceiling or other overhead structure (e.g., beam). In an alternate embodiment, the power and data lines may run through the bottom of the kiosk assembly and under the floor, omitting the top side poles. In this case, a cap 816 may be installed to cover the openings 808, 810.

Figure 9:
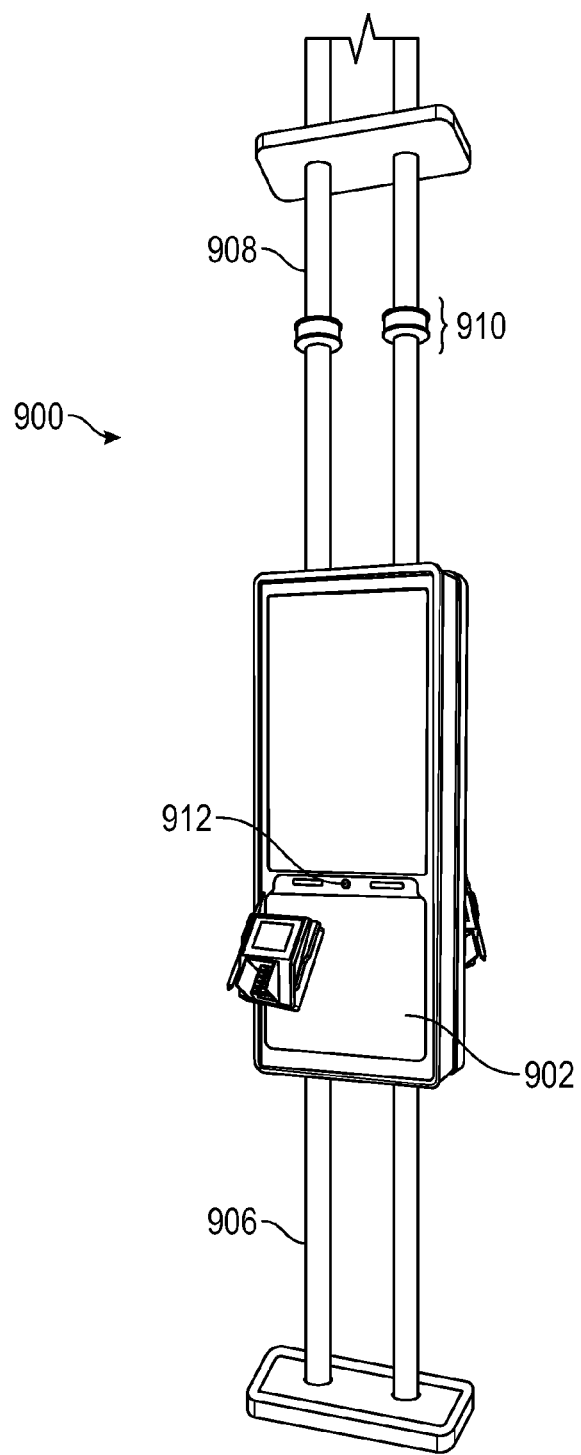

FIG. 9 is a perspective view of a two sided, pole mounted kiosk 900 comprising bottom poles 906, top poles 908, and a component panel 902 configured to support various ala carte components (described in greater detail below) including a "call for help," "press for assistance," or "panic" button 912. In the illustrated embodiment, the top poles include an alert light 910. When the panic button 912 is pressed, both the panic button and the alert light are configured to change color, for example from white to amber (or any other desired combination) to alert customer service personnel to assist the customer.

Figure 10:
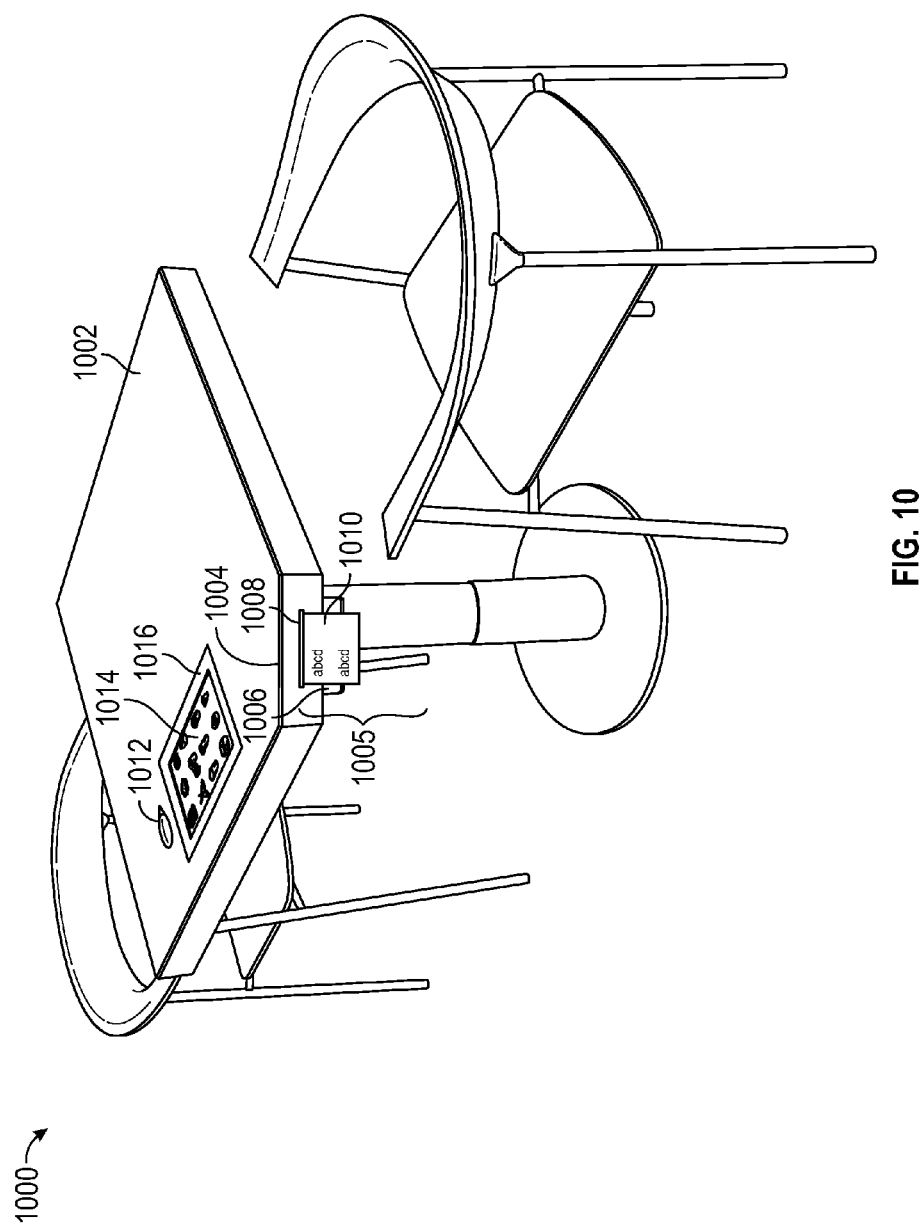
FIGS. 10-12 are table implemented kiosks in accordance with exemplary embodiments of the present invention.
Figure 11:
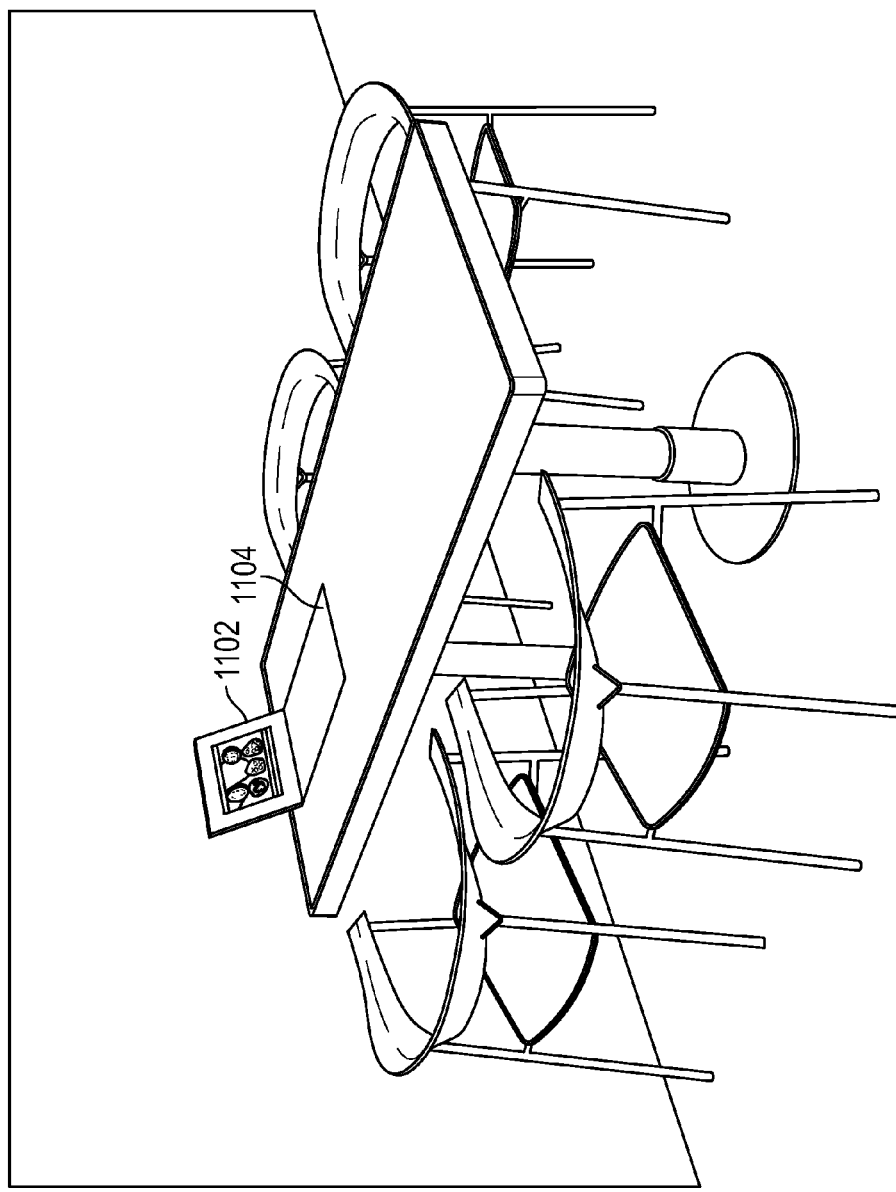
Figure 12:
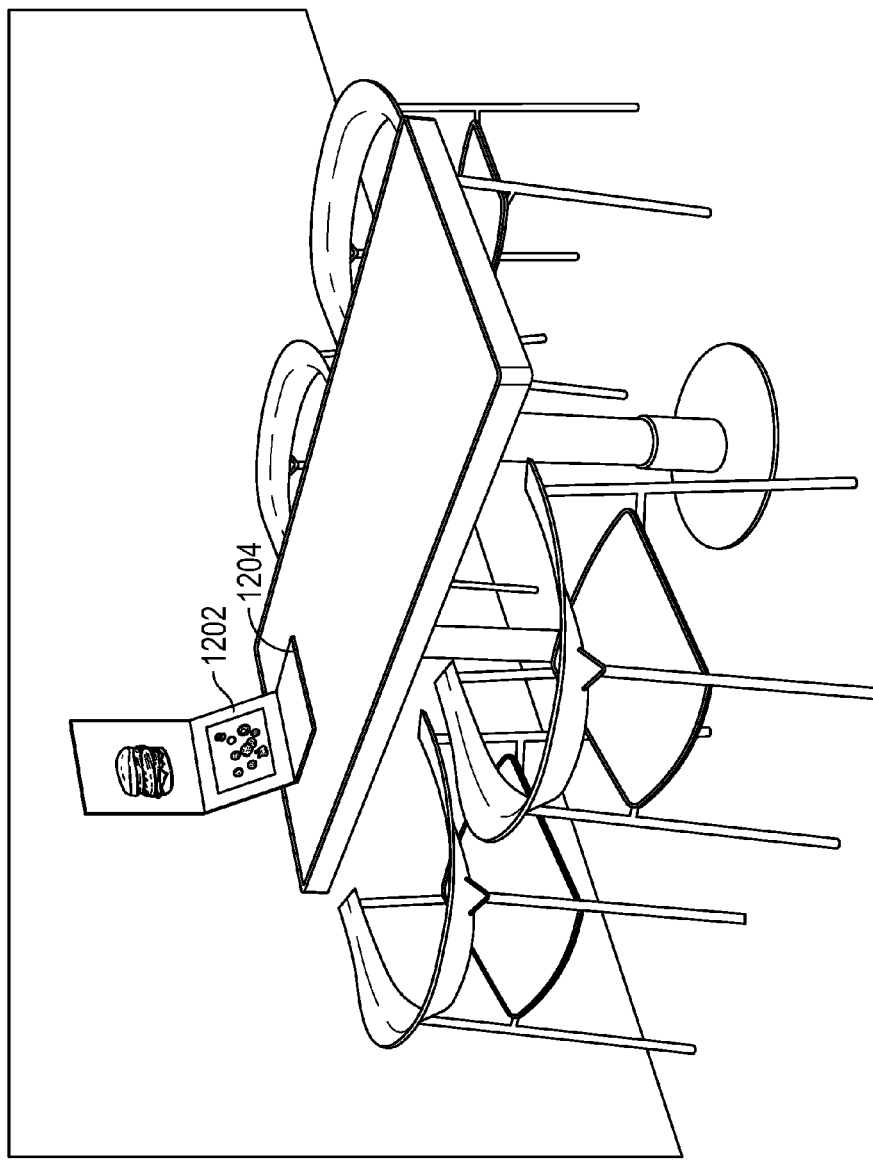

Referring now to FIGS. 10-12, various table mount kiosk configurations and features are show. More particularly, FIG. 10 illustrates a table type kiosk system 100 including a substantially rectangular table 1002, a truncated corner 1004 defining a printing region 1005, a printer module 1006 mounted to the underside of the printing region 1005, and a paper slot 1008 for presenting a receipt or other documentation 1010 to a user. The system 1000 further includes a contact or contactless payment module (or other component (s)) 1012, and a display 1014 preferably framed by a ring, bezel, or skin 1016. In the illustrated embodiment, the display is wholly integrated into the surface of the table top, and is parallel therewith. The display may be passive or interactive.

FIG. 11 shows an alternate embodiment in which the display comprises a first portion 1102 which extends upwardly at an angle from the plane of the table top, and a second portion 1104 which extends within the plane of the table top, referred to herein as an "in surface" implementation. FIG. 12 illustrates a further alternative embodiment in which the display includes a first portion 1202 which extends upwardly at an angle from the plane of the table top, and a second portion 1204 which extends parallel to but spaced apart from the plane of the table top, referred to herein as an "on surface" implementation. In yet a further embodiment, the table itself can also have a ring (not shown) in addition to a ringed display.

As described in greater detail below, many of the kiosk designs described herein (particularly wall mounted, counter top mounted, and table top implementations) include a ring circumscribing the perimeter of the kiosk. Other embodiments (particularly pole mounted and free standing implementations) employ distinctive blades extending vertically along the left and right edges of the kiosk. With momentary reference to FIG. 13, a cross-section view of a typical blade system 1302 includes respective oppositely disposed C-shaped blades 1308, each including respective end portions 1318 configured to grasp the front and rear surfaces of a kiosk 1306 in a manner generally analogous to a C-Clip in tension. Each blade 1308 is further characterized by a substantially linear middle portion 1314, and rounded portions 1316 disposed between the middle portion 1314 and each end portion 1318.

Figure 13:
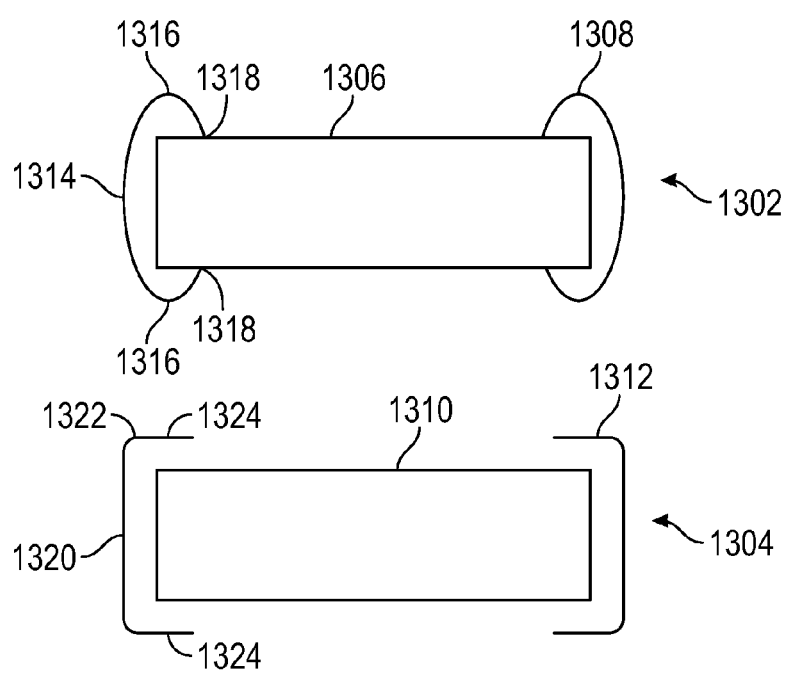
FIG. 13 shows cross section view of blades and a ring in accordance with exemplary embodiments of the present invention.

With continued reference to FIG. 13, a cross-section view of a typical ring system 1304 includes a circumferential U-shaped ring 1312 which includes respective end portions 1324 configured to grasp the front and rear surfaces of a kiosk 1310. The ring 1312 is further characterized by a substantially linear middle portion 1320, and rounded portions 1322 disposed between the middle portion 1320 and each end portion 1324. Those skilled in the art will appreciate that the ring is desirably flatter in cross-section (less rounded "corners") to facilitate manufacturing. Significantly, the rounded profiles of both the blades 1302 and ring 1304 protect consumers from sharp edges, fasteners, wiring, and any other potentially hazardous and/or unsightly features of the kiosk, and at the same time prevent unauthorized access to these same features.

More particularly, presently known kiosk designs employ a metal chassis which houses electronic components. One method of enhancing the appearance and covering any seams associated with stacked, multiple bodies involves the use of a tubular pole on each side of the kiosk. For example, ZIVELO™ (www.zivelo.com) has utilized a pole on each side, left and right, of the kiosk as a signature feature. In the past, the poles have always been structurally superficial and primarily decorative. The kiosk industry places a premium on encasing as many electronic components as possible in as little a space (thin in depth and width) as possible. Hence, one challenge revolves around routing components, hardware, and their supporting features within the kiosk cabinet. Providing access to this hardware becomes increasingly difficult as the depth and width are reduced. In many circumstances it has become necessary to access some features and hardware from the side of the kiosk. Furthermore, fast and simple removal methods are needed.

The present invention thus contemplates blades which perform an aesthetic function of covering a seam, as well as a safety function of covering attachment systems. The present invention further contemplates a method of manufacturing and installing blades on to a kiosk in a manner which decreases the appearance of the width of the kiosk vis-à-vis prior art tubular side poles.

Figure 14:
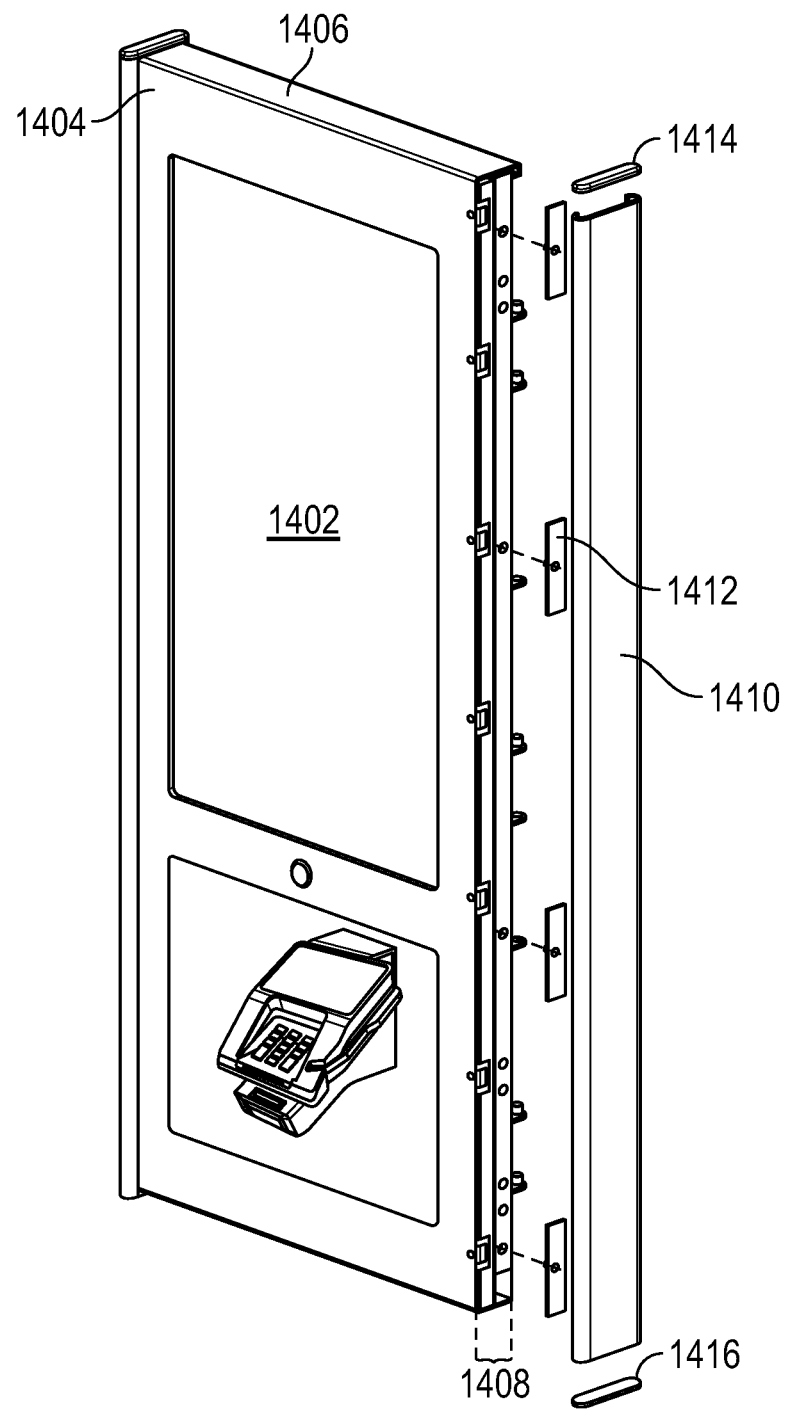

FIG. 14 depicts a portion of a kiosk assembly including a display 1402, a face plate or skin 1404 (described in greater detail below) having an overhanging portion 1406 within which a frame 1408 is secured. Once the frame 1408 is secured to the face plate 1404, respective blades 1410 may be secured to both side edges (left and right) of the assembly, for example using respective mounting plates 1412. Respective end caps 1416 and 1416 may be placed in the ends of the blades to complete the installation.

FIG. 15 is an exploded view illustrating the attachment of a blade 1510 to a side 1508 of the frame 1408 of FIG. 14, using a stud assembly 1530 and a mating nut or other fastener 1532 in accordance with an exemplary embodiment. As seen in FIG. 16, a stud assembly 1630 comprises a weld plate 1640 which secures a press stud 1550 to a blade 1610, whereupon the blade may be secured to a frame 1608 by inserting the stud 1650 into a corresponding hole 1609 in the frame 1608, and securing a nut to the end of the stud.

By employing easily changeable blades, a kiosk may be refreshed, repaired, and/or otherwise upgraded by swapping out blades of different colors (including transparent, translucent, or metallic colors), materials (including aluminum, chrome), texture, and the like, or by adding lighting within the blade to further enhance the appearance and function of the blades.

Figure 17:
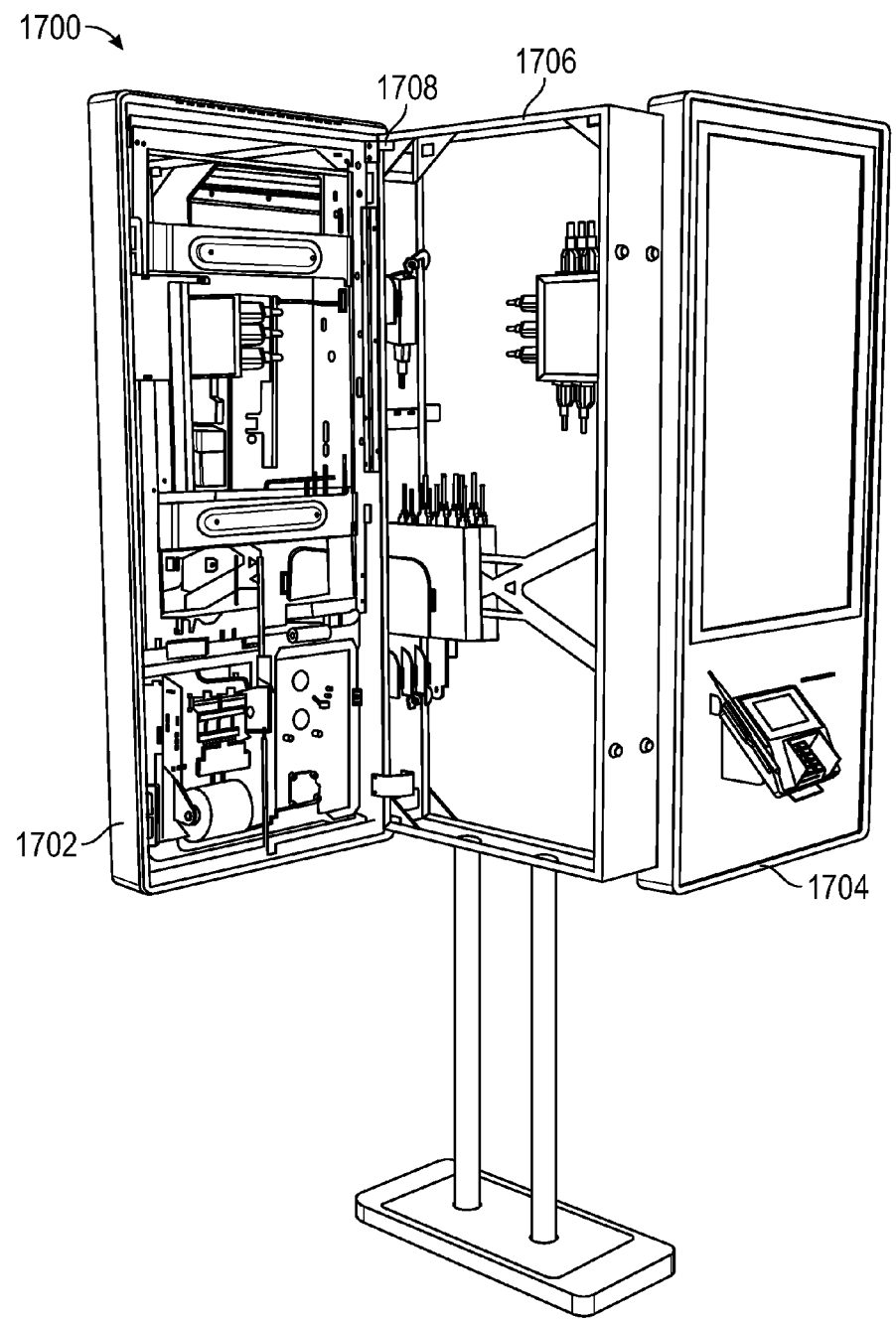
FIGS. 17 and 18 illustrate a general overview of a double sided kiosk in accordance with exemplary embodiments of the present invention.
Figure 18:
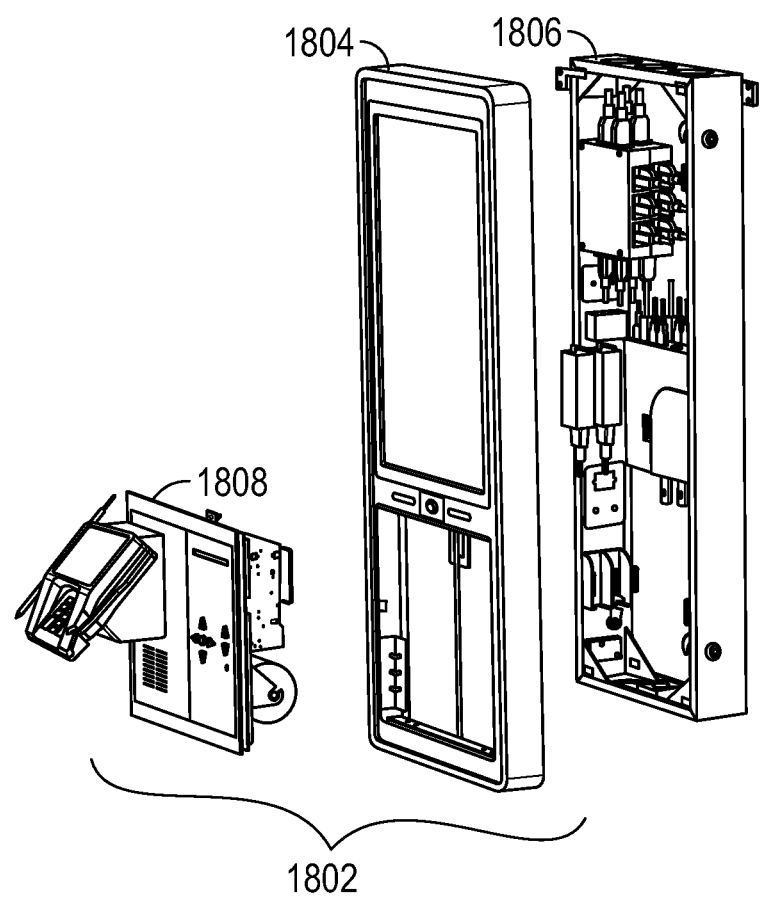

An overview of a double sided kiosk, generally analogous to the pole mounted kiosk 108 of FIG. 1, will now be undertaken with reference to FIGS. 17 and 18. FIG. 17 depicts a double sided kiosk system 1700 including a first kiosk 1702 and a second kiosk 1704, each mounted to a center chassis or cabinet 1706 by hinges 1708. As such, each kiosk functions as a door which may be opened to expose the back of the kiosk and the interior of the center cabinet. When both "doors are closed, the assembly resembles the double sided models shown in FIGS. 8 and 9.

FIG. 18 shows an exploded view of a single kiosk 1802, including a component door assembly 1804 (described in greater detail below) and a sub-chassis 1804, shown aligned with a central cabinet 1806. The construction and assembly of the sub-chassis 1804 is described in greater detail below.

Those skilled in the art will appreciate that the total cost of ownership of a kiosk is an important factor in a purchasing decision. The present invention addresses this concern through various "future proofing" and "obsolescence mitigation" techniques, whereby structural features and considerations are incorporated into the design and manufacture of the kiosk, which together reduce the total cost of ownership and maintenance over the life of a kiosk.

More particularly, replacing the display with a non-original equipment display can be expensive and disruptive, particularly when doing so requires that the chassis to which the display is mounted must also be replaced. Indeed, the display is the main component of most kiosks and normally the kiosk is essentially designed around the display. Typical prior art kiosk design is such that the face or front of the kiosk is an integral component of the chassis or is substantially involved in securing components including the display, thereby making any upgrade or replacement with a different size display require a significant rebuilding of the kiosk.

Conventional wisdom dictates that successive versions of electronic components tend to get smaller over time, and therefore adapting for larger component integration is deemed unnecessary; however, this is not necessarily true with displays and touch screens. In reality, as the screen and touch surface are maximized, often the foot print will grow, shrink or change aspect ratio (height to width ratio). For example, the most common touch technologies used today are the IR (infrared) and SAW (surface wave acoustic). The next generation of touch technology employs PCAP (projective capacitive) touch screens, commonly found on cell phones. This technology allows glass to extend to the edge of the screen which is highly desirable in kiosks because it removes the step and ledge between the screen and the kiosk body. PCAP displays are larger and the opening size is different and therefore it is almost impossible to retrofit a PCAP display into a kiosk designed for IR or SAW displays.

The present invention involves a method of installing a display into a kiosk where display replacement with existing alternatives and/or yet unknown touch and screen technologies is possible. The method involves at least two features which work in conjunction. The first is a removable skin as the final façade, bezel or fascia, referred to as a face plate which functions as the front of the kiosk and closely surrounds the display. The second is the mounting of the display with deliberate room for the installation of future displays using an intermediary bracket. The combination of these two features allows for the cost effective replacement or upgrade of the display by employing a new faceplate to match the new display size, if needed.

Figure 19:
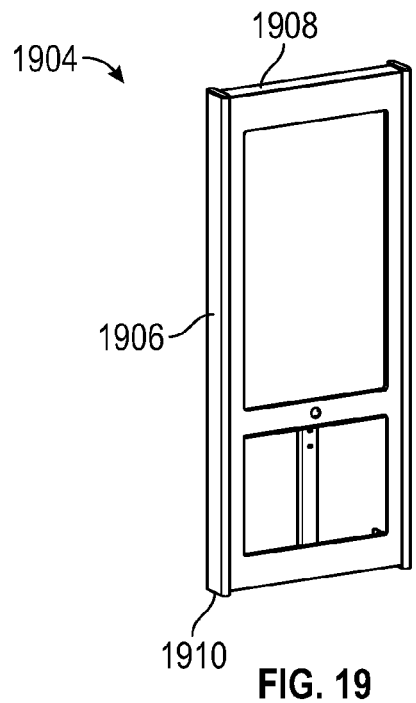
FIGS. 19-23 illustrate the replacement of a display in accordance with exemplary embodiments of the present invention.
Figure 20:
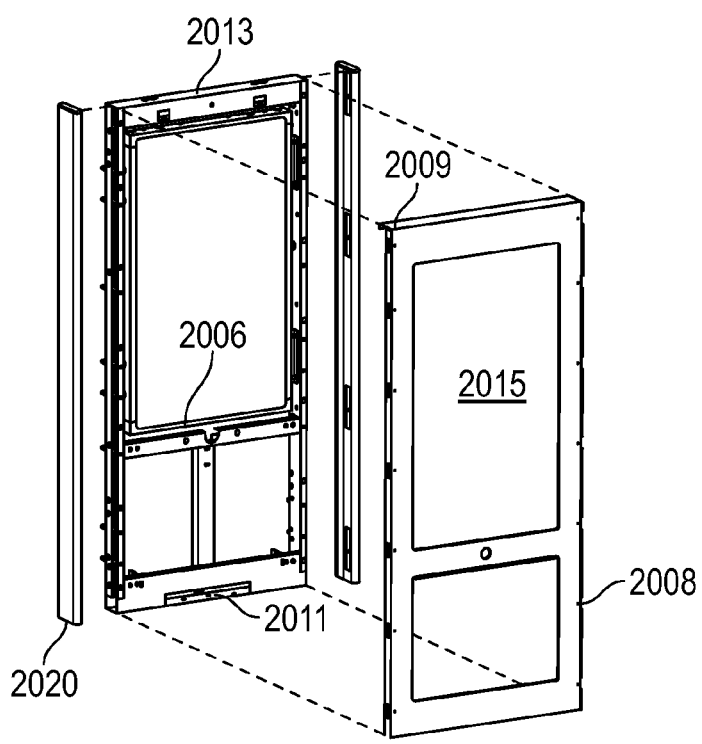

The construction and assembly of the sub-chassis 1804 of FIG. 18, including the future proof technique of display installation and replacement, will now be described with reference to FIGS. 19-22. FIG. 19 depicts an assembled sub-chassis 1904 including a display 1906, a face plate 1908, and respective blades 1910. FIG. 20 is an exploded view of the sub-chassis shown in FIG. 19, and illustrates a frame 2011 having a top surface 2013, and a face plate 2008 having a clip or hook portion 2009 configured to be secured over the top portion 2013 of the frame 2011. When so assembled, the blades 2020 may be attached, for example, as described above in conjunction with FIG. 15.

Figure 21:
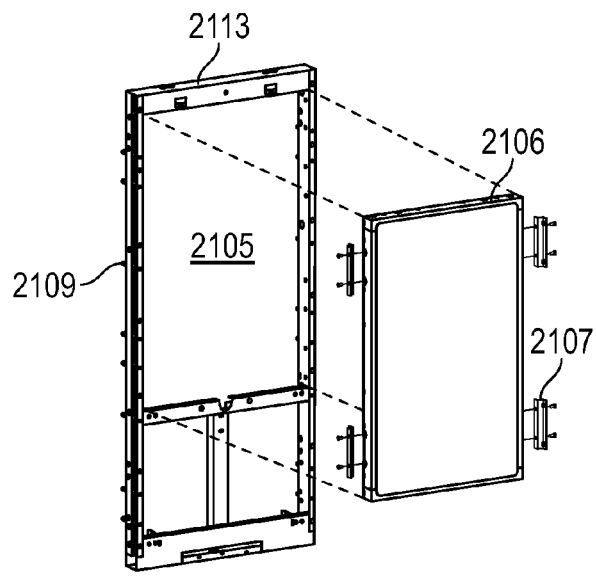
Figure 22:
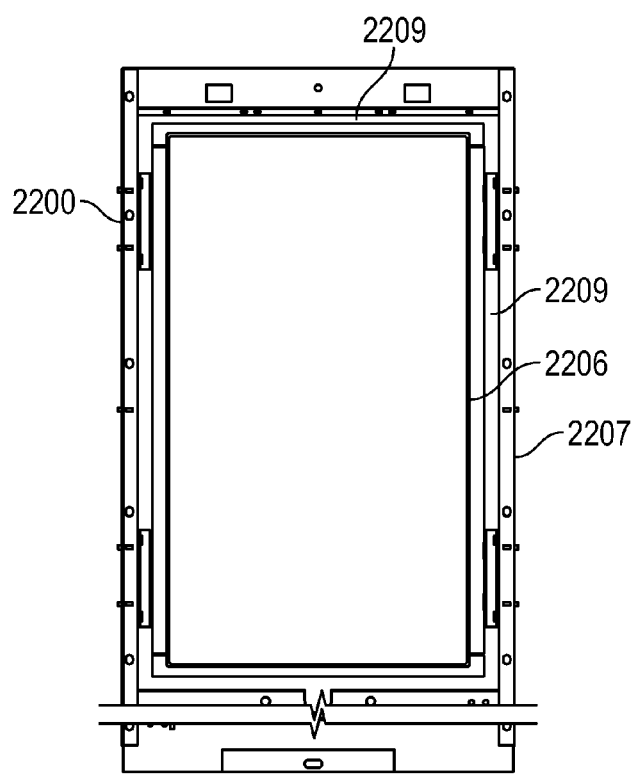

FIG. 21 depicts a frame 2113 including an opening 2105 within which a display 2106 is to be installed using V, Z, or similarly configured brackets 2107 at attachment sites 2109. FIG. 22 shown a display 2206 installed within a frame 2200 using brackets 2207, resulting in a gap 2209 of sufficient size to allow differently configured displays to be interchanged, as desired. With momentary reference to FIG. 20, when a new display of a different size and/or configuration is installed, a new face plate may also be installed which includes an opening 2015 which closely corresponds to the shape of the newly installed display. In various embodiments the gap 2209 may range from zero to several inches, and preferably about ¾ of an inch.

Figure 23:
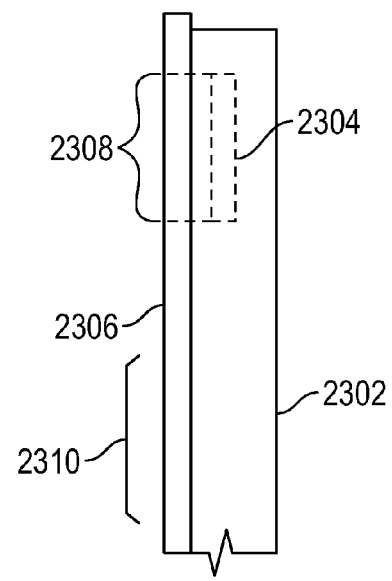

FIG. 23 shows an alternate embodiment in which the modular approach to replacing a display me be implemented without using a sub-chassis. In particular, FIG. 23 illustrates a main chassis 2302 in which a display 2304 is replaceably secured, along with a face plate 2306 having an opening 2308 which closely matches the configuration of the display 2304. The face plate 2306 may also include a component door 2310 to further exploit the modularity features described herein.

In a further alternative embodiment, a separable bezel ring may be employed around the display opening in lieu of a replaceable face plate. This separable and replaceable bezel ring would then allow for the changing of screen opening without the replacement of the faceplate. In this embodiment, the bezel ring assumes the role of the faceplate. In this alternate embodiment, the faceplate can maintain some of the more traditional functions of securing components and even the display bracketry. This alternate embodiment may be utilized when the kiosk structure allows for a rear door for access and the face is fixed as part of, or to, the body of the kiosk. This differs to the preferred embodiment in which the face frame is a door and acts as access to the internals of the kiosk and thus mandates a face frame structure.

Another "future friendly" aspect of the present invention, involves disposing various components with which the user interacts together, and implementing them in a replaceable component door. In this way, analogous to the replaceable display discussed above, various components such as a printer, payment module, ADA pad, speaker, panic button, scanner, call assist button (typically tactile (braille) for the blind), and other functional modules that the user interacts with may be reconfigured while only having to replace a single, integral component door which houses the replaceable components, as opposed to having a plurality of component doors for a plurality of components. In this regard, the component door and face plate work together, in that if a different size/shape/location component door is used, then the faceplate may be configured to accommodate the newly configured component door.

Figure 24:
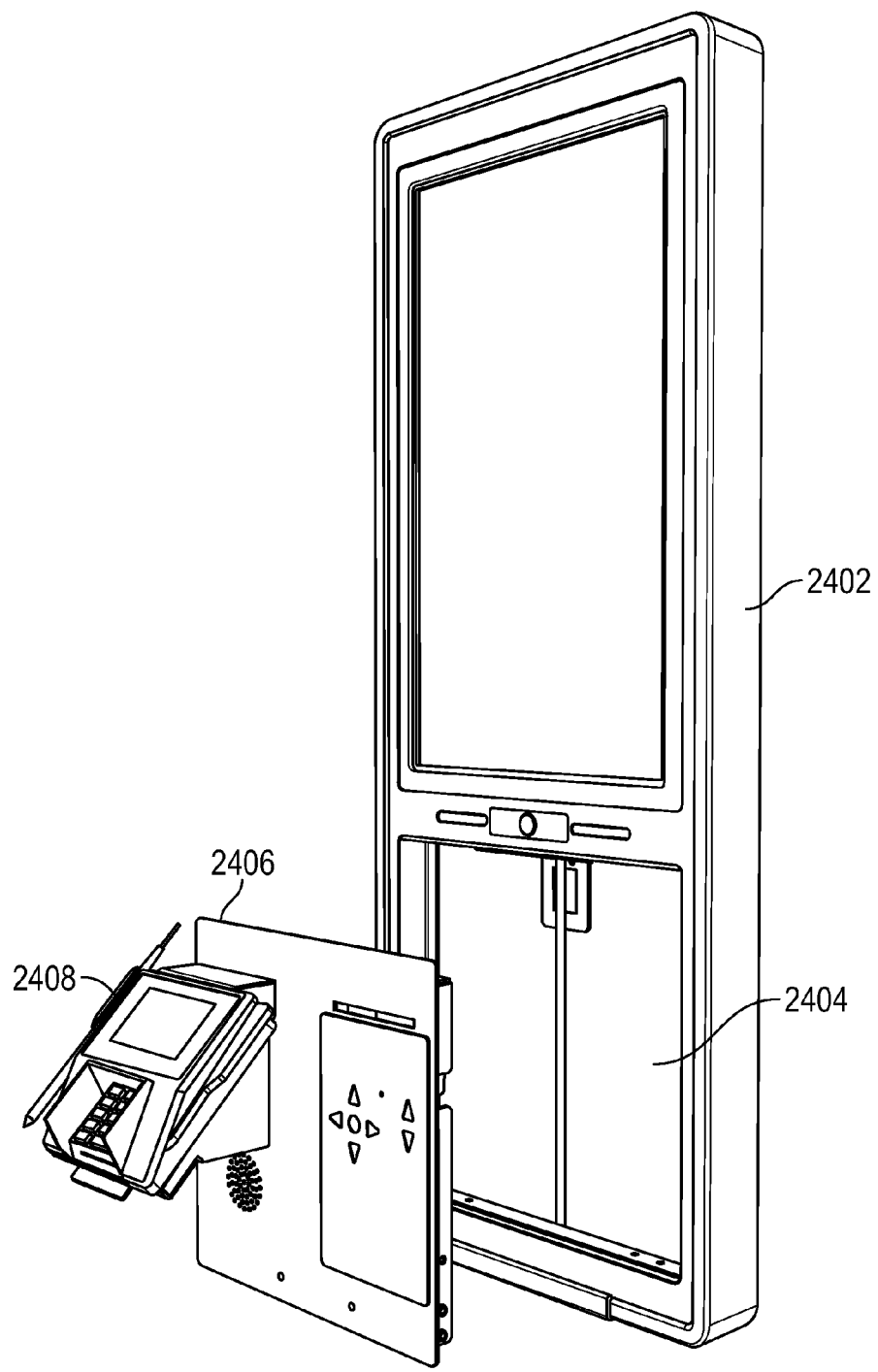
FIGS. 24-28 illustrate component door configurations in accordance with exemplary embodiments of the present invention.

More particularly, FIG. 24 depicts a sub-chassis (door) 2402 including a component installation region 2404, and a removable component door 2406 removably attached to the sub-chassis 2402. In the illustrated embodiment, the component door includes a payment module 2408. When the kiosk is updated to add, remove, or replace a component, a new component door is substituted for the old one, such that the existing sub-chassis may remain intact and need not be replaced in order to accommodate the reconfiguration of components.

Figure 25A:
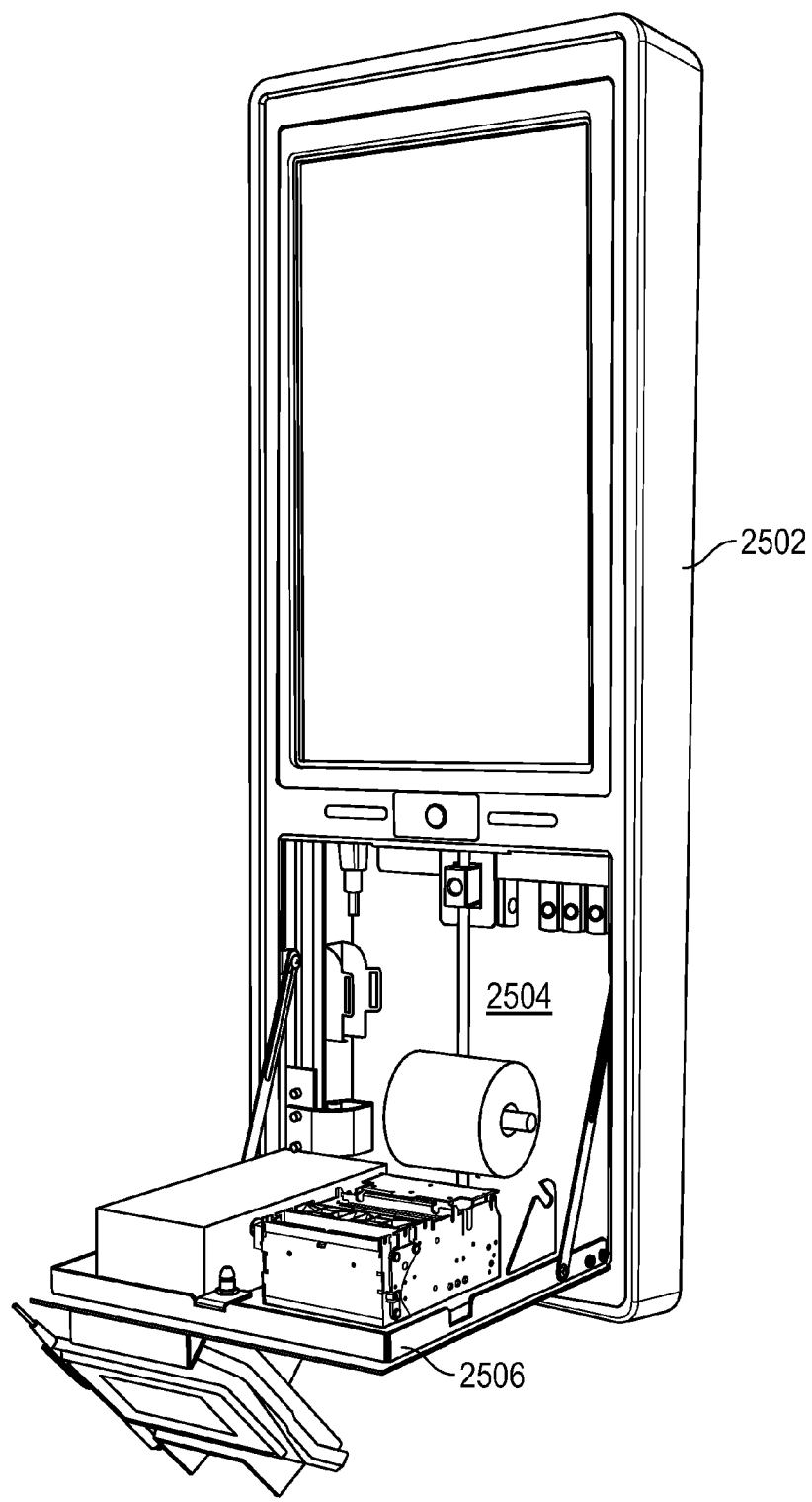
Figure 25B:
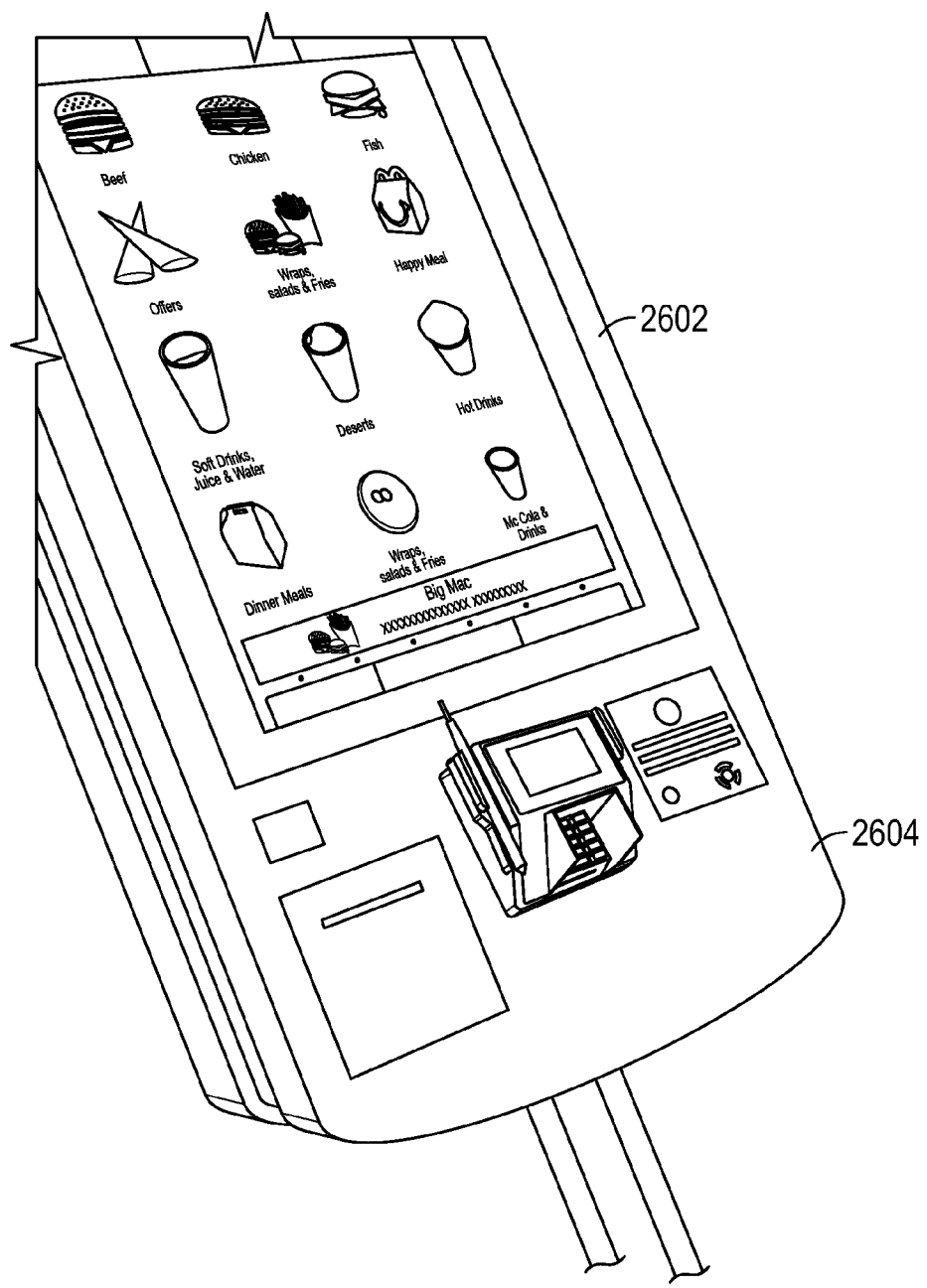

FIG. 25A depicts a kiosk 2502 including a component region 2504 and a hinged component door 2506 shown in the open position, providing access to the components by service personal. FIG. 25B shows a kiosk 2602 with a component door 2604 in the closed position.

Figure 26:
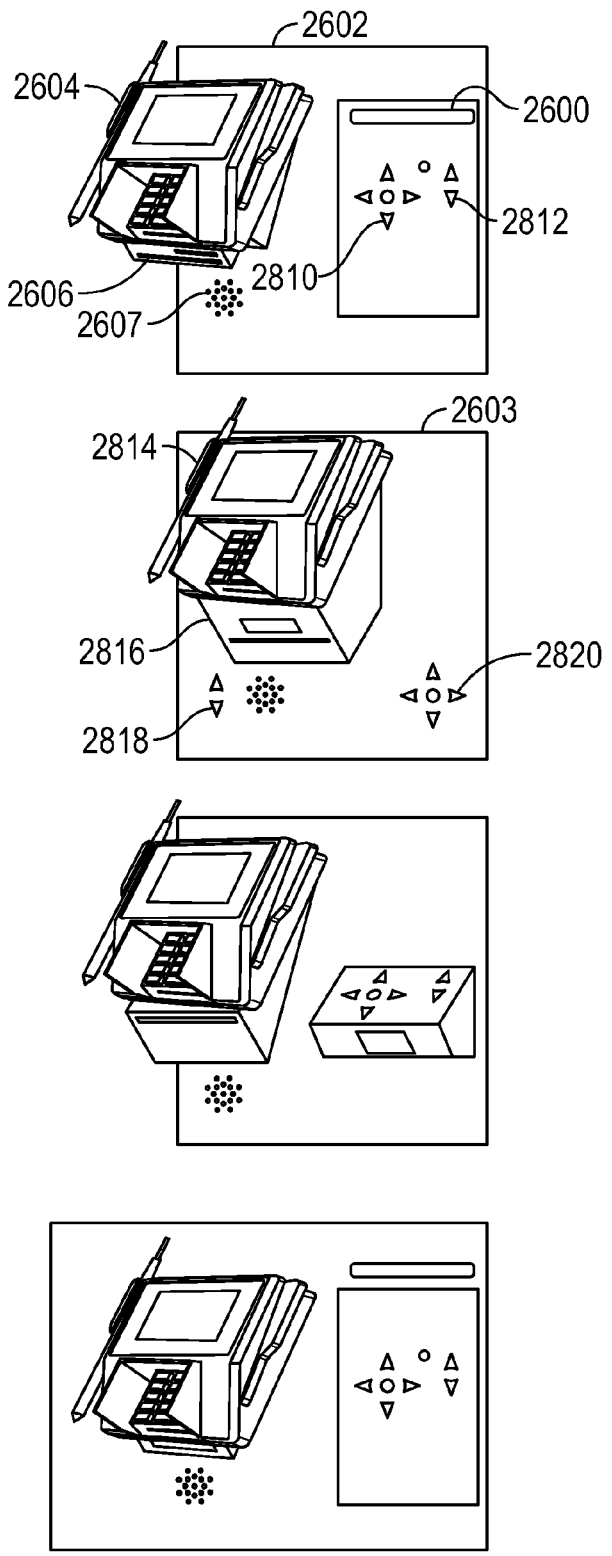

FIG. 26 shows various non-limiting examples of component door configurations and corresponding arrangements of components. In particular, a component door 2602 includes a payment device 2604 having a first scanner 2606 mounted underneath the payment device, a speaker 2607 proximate the scanner, a navigation 2810 near the center of the door, a receipt printer near the upper right, and a volume control 2812 to the immediate right of the navigation keys. In a alternate embodiment, a component door 2603 includes a payment device 2814 mounted on a combined printer/scanner 2816, with a volume control 2818 disposed on the lower left of the door, along with a navigation pad disposed near the lower right corner. Various other component configurations are also shown.

It can thus be appreciated that any number of component configurations—and reconfigurations—may be employed in the context of the various kiosk devices set forth herein. By intelligently configuring the components in a component region, only the component door needs to be replaced (as opposed to the entire chassis or sub-chassis) when the components are reconfigured.

Figure 27:
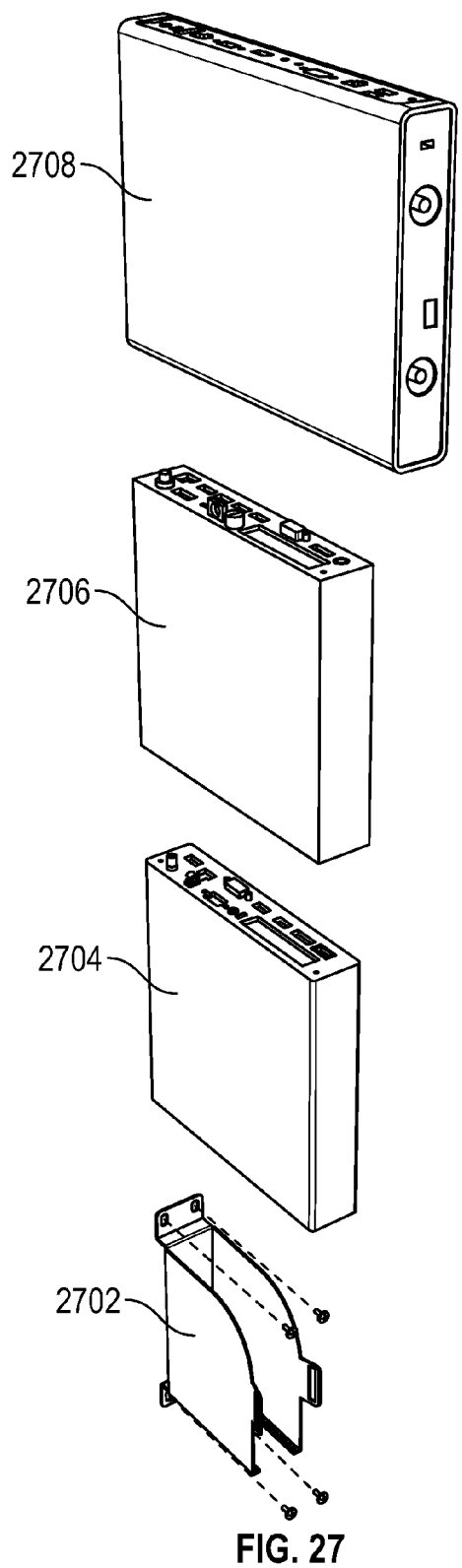

It will also be appreciated that certain components may need to be replaced/reconfigured which may not be conveniently located within a component region of the type covered by a reconfigurable component door. For example, the main kiosk computer (referred to herein as a PC) is typically housed in the main chassis of a double or single sided kiosk system. As seen in FIG. 27, however, it may still be possible to exploit the modularity feature of the present invention when upgrading the PC. In particular, by configuring a PC basket 2702 to accommodate various PC sizes and configurations 2704, 2706, and 2708 (analogous to the oversize display frame discussed above), the main PC may be upgraded with minimal effort, expense, and reassembly.

Figure 28:
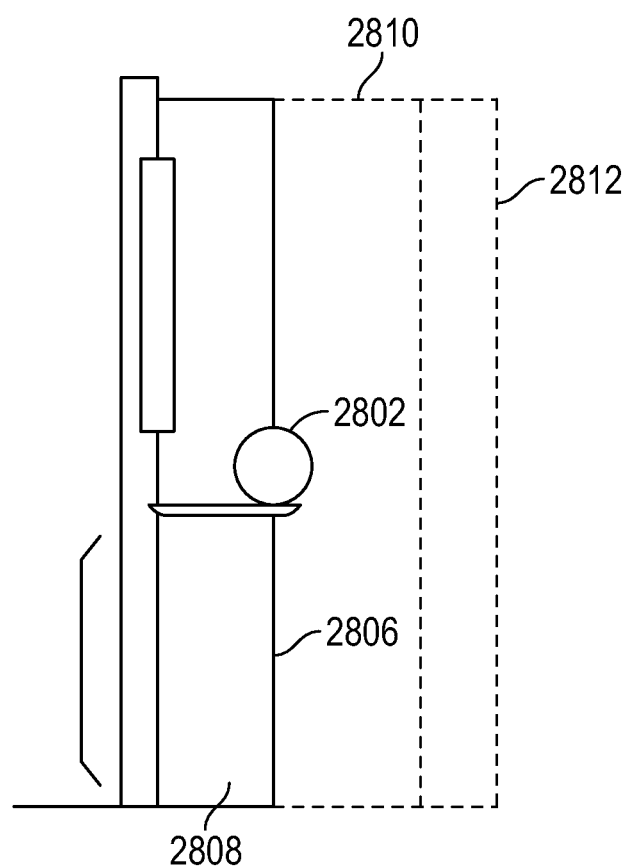

In another embodiment, the main chassis may be extended to accommodate component additions and/or reconfigurations which may not be adequately addressed by reconfiguring a component door. For example ad referring to FIG. 28, there may be some components such as a printer roll 2802 which cannot be conveniently accommodated by re-configuring a component door 2804. In such a case, it may be desirable to remove a removable back plate 2806 from the back of a chassis 2808, and replace it with a chassis extension 2810 to effectively increase the depth of the chassis to accommodate the reconfigured component (the paper roll in the illustrated embodiment). If at some later point the chassis needs to expanded again, a further extension 2812 may be installed.

Figure 29:
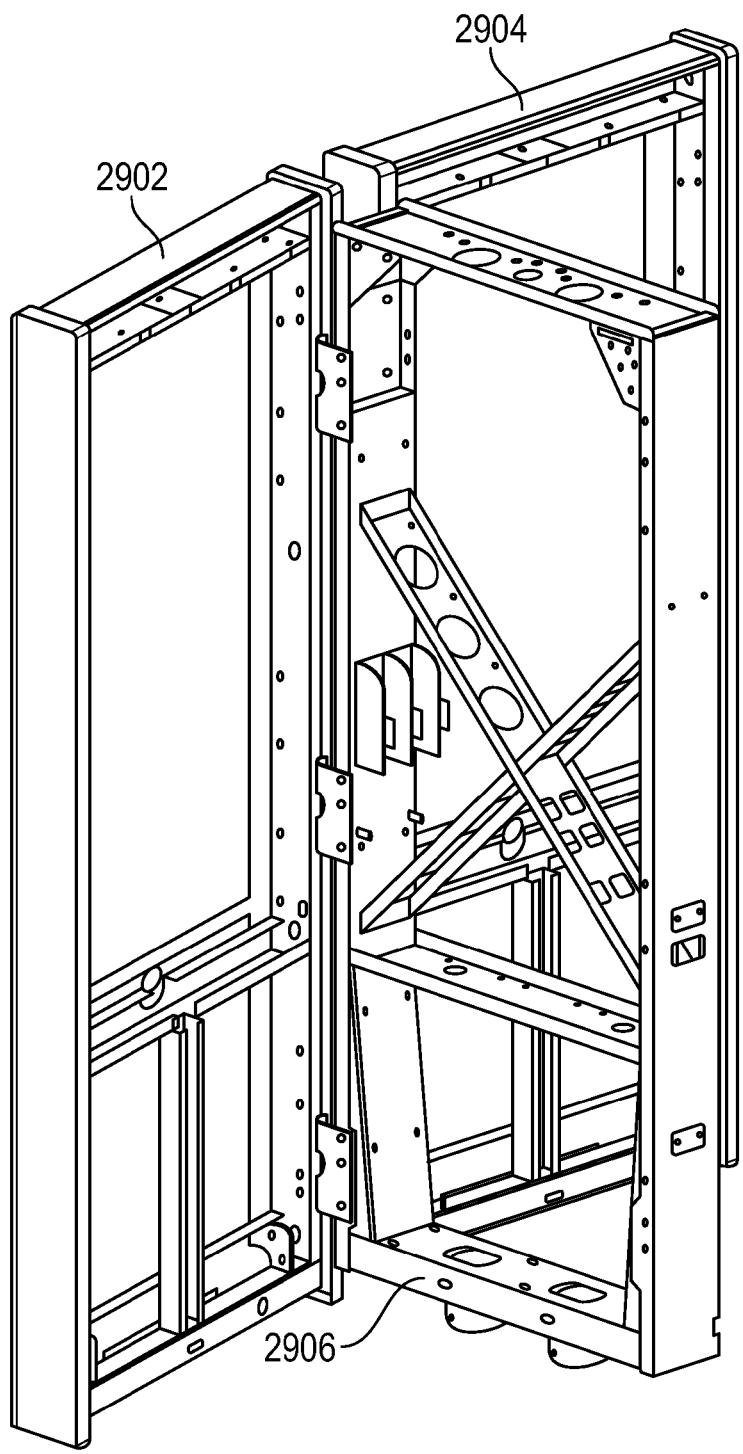
FIGS. 29-35 illustrate stiffening features to resist external forces applied to a kiosk in accordance with exemplary embodiments of the present invention.
Figure 30:
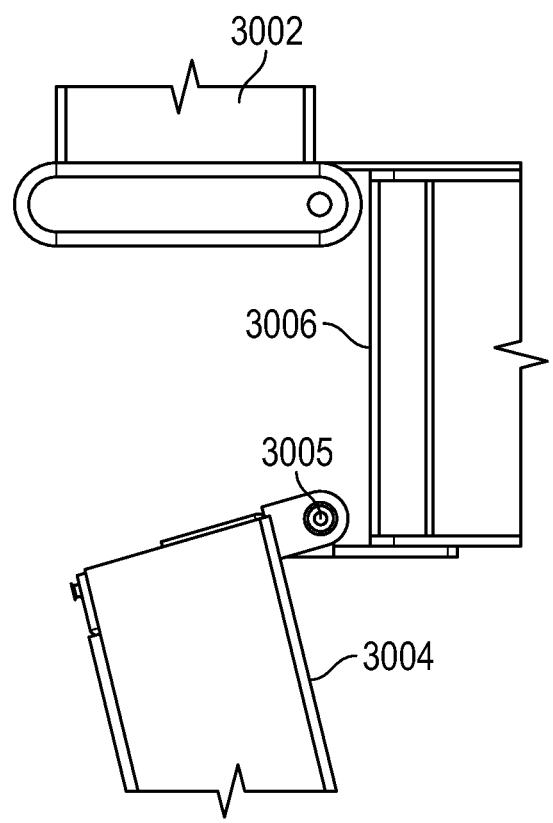

Referring again to FIG. 17, the main chassis 1706 houses one or more power supplies, plugs for electrical components, the main PC, lighting, the contents of the component region when the sub-chassis door is closed, and various other equipment. In addition, the main chassis provides structural support for the kiosk assembly. However, due to the elongated (top to bottom) shape and thin profile, the main chassis is vulnerable to twisting, for example, resulting from user interaction with a touch screen display, various components (e.g., key pad, call button), or simply as a result of a person leaning on the structure. Moreover, as shown in FIG. 29, the weight of one or two hinged sub-chasses in the open position can impart significant torque to the main chassis 2906. In FIG. 30, the blade is removed from the hinged edge of a sub-chassis 3004 to reveal the hinge 3005 connection to the main chassis 3006. Protecting the main chassis (as well as a sub-chassis) from torsional forces remains a vexing problem for kiosk designers.

Figure 31:
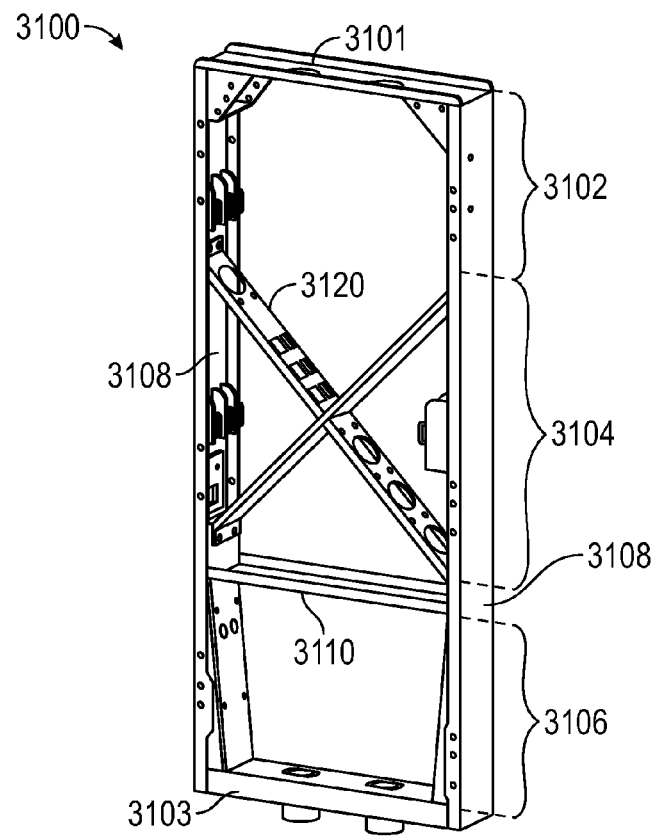

Referring now to FIG. 31, a main chassis frame 3100 includes respective vertically extending U-channel (inwardly facing) side members 3108, a top member 3101, and a base member 3103. For purposes of the ensuing discussion, the main chassis or cabinet 3100 may be divided into a top region 3102, a middle region 3104, and a bottom region 3106. In various embodiments, the top region 3102 houses the main PC(s) and, hence, installing stiffening cross members in this region is problematic. The bottom region 3106 generally corresponds to the component region discussed above and, hence, installing stiffening cross members in this region is similarly problematic. An intersecting cross member 3120 may, however, be conveniently disposed within the middle region 3104, as described below.

Figure 32:
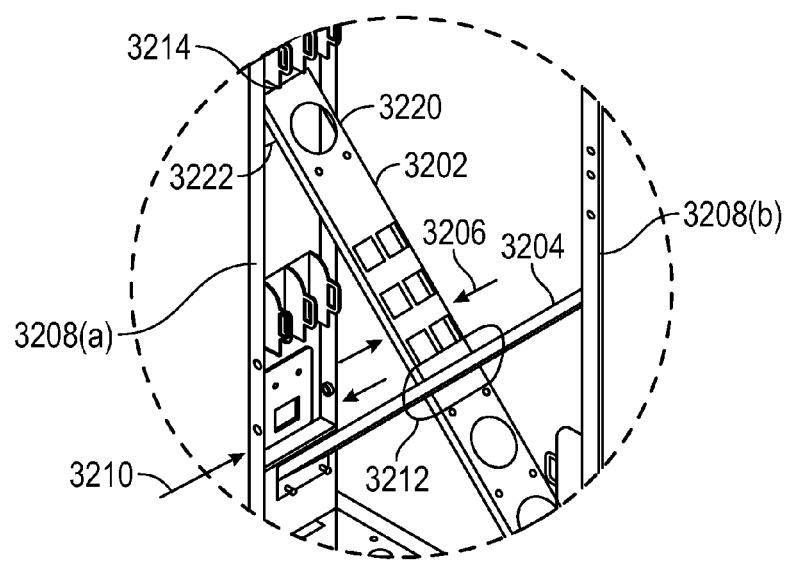

With reference to FIG. 32, a cross member 3202 interconnects the left side member 3208(a) and the right side member 3208(b) of the main chassis. In particular, the cross member includes a first leg 3202 and a second leg 3204 which intersects the first leg 3202 at a junction 3212. The top of the first leg 3202 is attached to the inside of the left side member 3208(a) near the top of the middle region 3104, and the bottom of the first leg 3202 is attached (not shown) to the inside of the right side member 3208(b) near the bottom of the middle region 3104. Similarly, the top of the second leg 3204 is attached to the inside of the right side member 3208(b) near the top of the middle region 3104, and the bottom of the second leg 3204 is attached to the inside of the left side member 3208(a) near the bottom of the middle region 3104. Each leg of the cross member 3202 suitably forms an acute angle 3222 with respect to the side member to which it is attached. Moreover the legs of the cross brace should be of substantial width 3206 relative to the width 3210 of the side members. Importantly, the intersection 3212 must securely attach the first leg to the second leg, for example, using a weld along the line of intersection.

Figure 33:
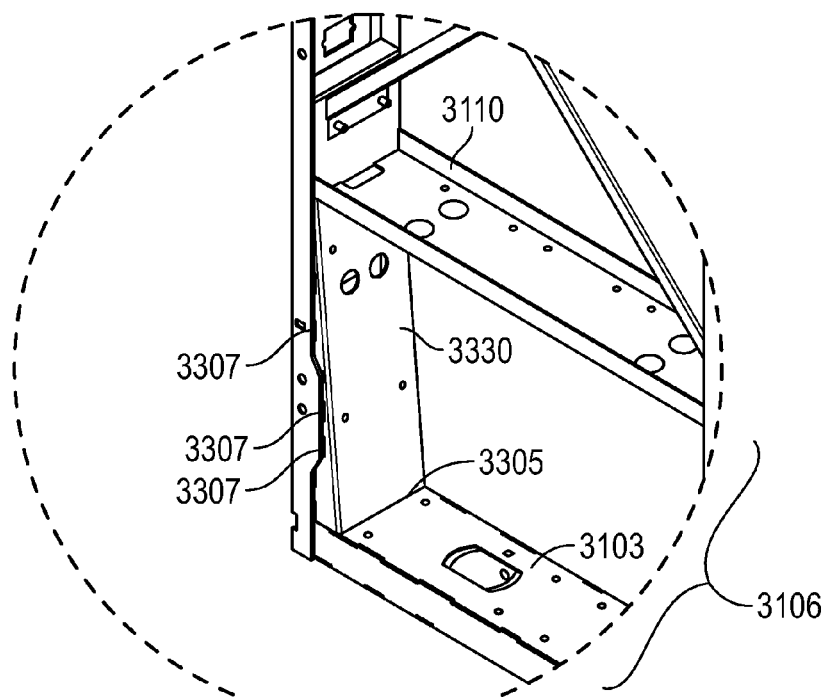

Referring now to FIG. 33, the bottom region 3106 may be reinforced to resist torsion through the use of a tapering tubing reinforcement structure on each side of the defined by member 3110 on top, member 3103 on the bottom, the lower part of side member 3208(a) on the left, and the lower part of side member 3208(b) on the right. In particular, each tapering tubing reinforcement structure a tapering member 3330 which extends inwardly from the side member 3208(a) as the tapering member 3330 extends downwardly, attaching to member 3103 along a joint 3305. The tapering tubing reinforcement structure is suitably stitch welded or otherwise secured to the inside of the side member 3208(a) as shown by stitch weld markings 3307.

Figure 34:
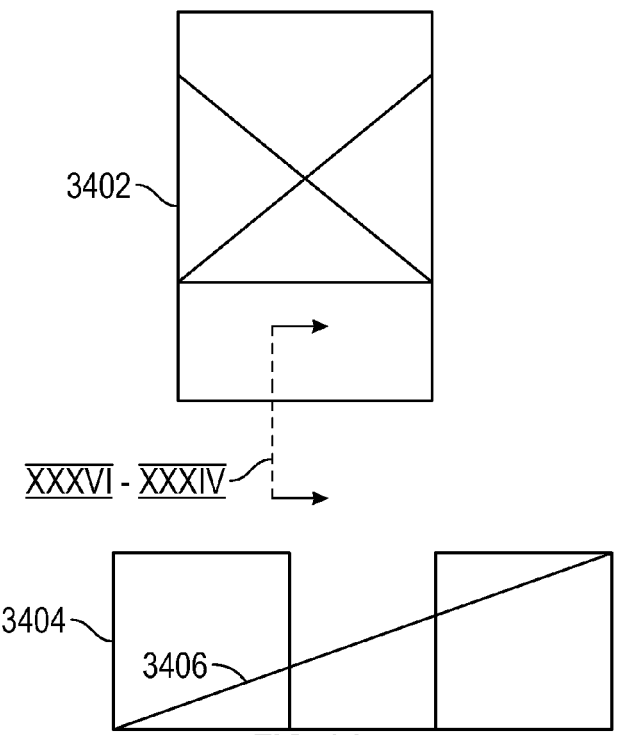
Figure 35:
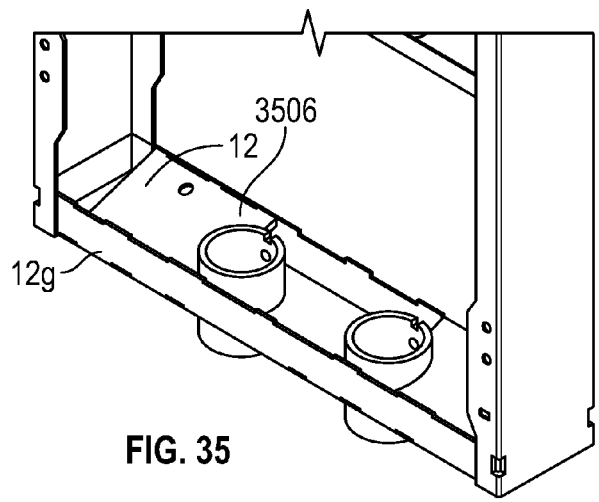

Referring now to FIG. 34, a cross section view taken along line XXXIV-XXXIV of a cabinet 3402 reveals a second tubular reinforcement structure 3404 including a cross member which provides additional stiffening against torsion. FIG. 35 shows a detail view of the cross member 3506 with the base plate 3103 removed for clarity.

Referring again to FIG. 31, the middle region 3104 may be configured to house a power supply. As such, the member 3110 may be configured to prevent manual access from the component region (the bottom region 3106) to the middle region 3104. In addition, the main cabinet may include two separate lockable access regions, namely, a first keyless region (for example, corresponding to the component region 2504 of FIG. 25) and a second higher security zone (e.g., region 3104 and/or region 3102) which requires a key to access. The keyless zone may include access the printer, and may be keylessly accessed using a push button with one hand while at same time pulling a latch with the other hand, all of which may be blind to the user to thereby balance enhanced security with the need for ready access by maintenance personnel.

Figure 36:
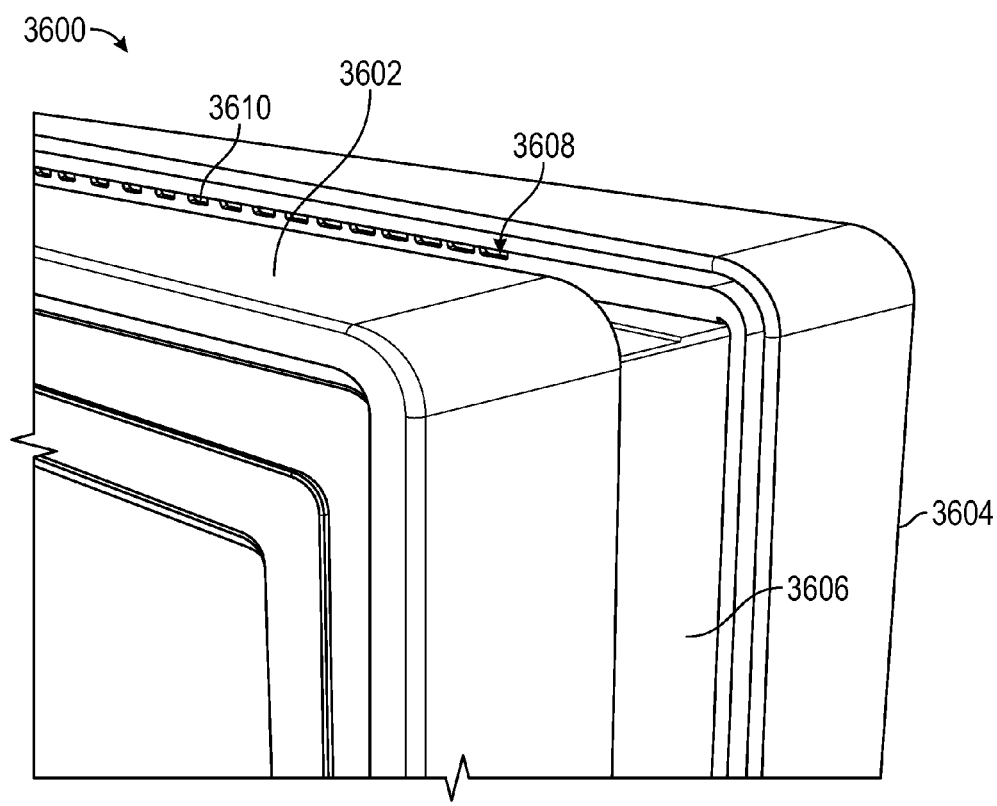
FIGS. 36-39 illustrate water ingress prevention and air flow paths in accordance with exemplary embodiments of the present invention.

The present invention contemplated various design techniques for impeding or preventing liquid ingress and for facilitating air flow through kiosks. With initial reference to FIG. 36, a double sided kiosk assembly 3600 includes a first kiosk 3602, a second kiosk 3604, and a main cabinet 3606 sandwiched therebetween. It is desired to prevent liquid ingress into the assembly, particularly in the vicinity 3608 between the two kiosks. In an outdoor implementation, it is important to keep rain and snow from entering the assembly. In indoor implementations, it is important to prevent spilled beverages and the like from entering the assembly. In both implementations it is desirable to also facilitate air flow through the kiosks, without the use of air flow perforations or other openings such as voids 3610 which might otherwise be vulnerable to liquid ingress.

Figure 37:
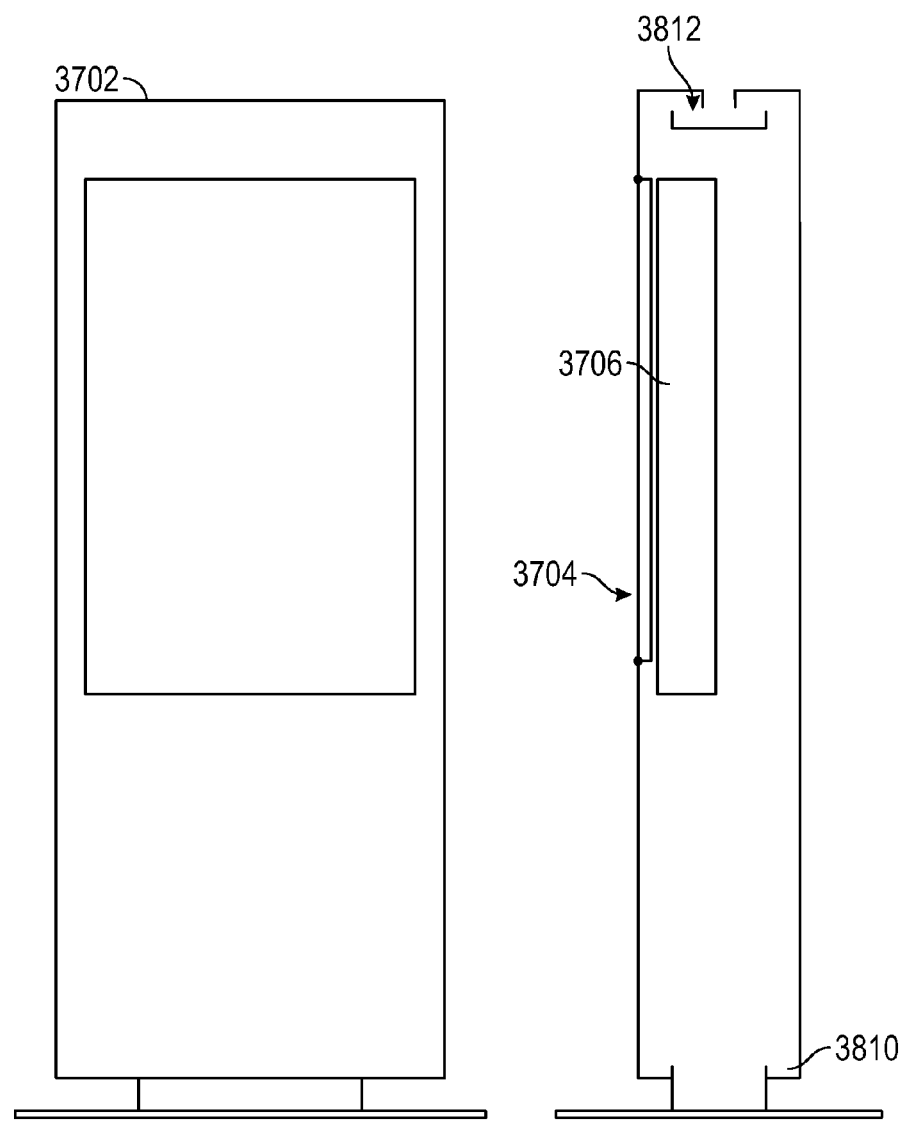

FIG. 37 shows a schematic cross-section view 3704 taken along line J-J of a double sided kiosk assembly 3702. In the illustrated example, a display 3706 could be mounted to a face plate, sub-chassis (door chassis), or to a center chassis. The cross-section view 3704 schematically illustrates an air flow circuit comprising an air inlet path 3810 and an air discharge path 3812.

Figure 38:
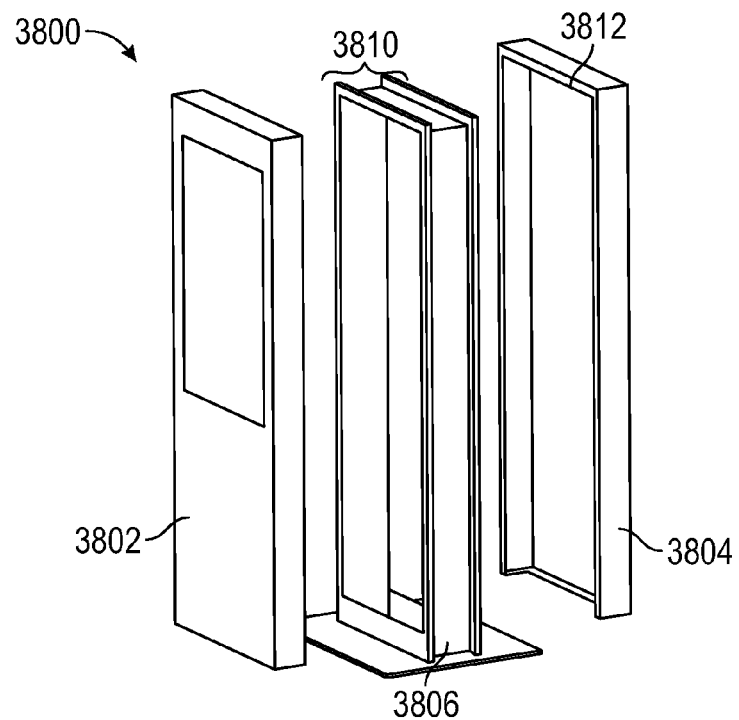

Referring now to FIG. 38, a kiosk assembly 3800 includes a first face frame 3802, a second face frame 3804, and a center chassis 3806 having an outwardly facing U or C shaped channel perimeter 3810. Each face frame suitably includes a downwardly extending lip 3812 which, in conjunction with channel 3810, mitigates water ingress while at the same time facilitates air discharge. Specifically, the air discharge path 3812 is configured to prevent splashing from entering the internal region of the assembly.

Figure 39:
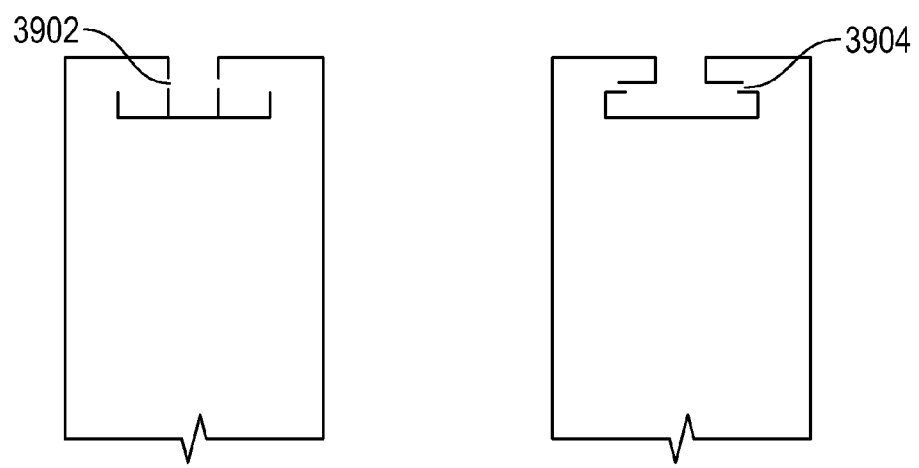

FIG. 39 illustrates alternate geometries which also include kiosk frames having an overhanging/overlapping portion which interacts with the U channel of the cabinet to form a zig zag path, and thereby prevent water ingress into the kiosks and allow air outflow from the kiosks. In addition, the geometries provide gaps 3902 and 3904 to allow the face frames to swing on a hinge relative to the main cabinet. If desired, a fan may be configured to pressurize the air discharge path to further facilitate air flow through the kiosk.

The present invention further contemplates kiosks configured to be mounted onto and into countertops, and for configuring counters to accommodate kiosks and various components associated therewith.

Figure 40:
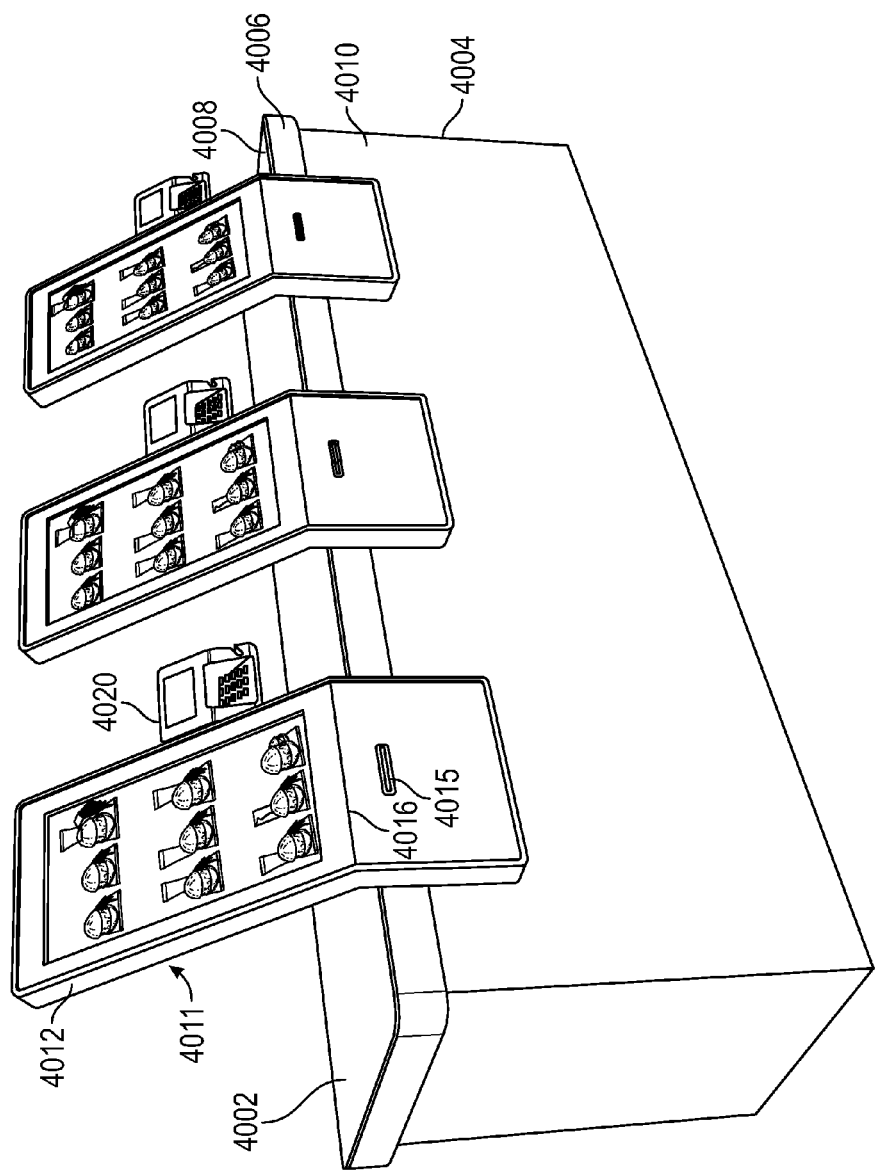
FIGS. 40-52 illustrate various counter top mounted kiosk configurations in accordance with exemplary embodiments of the present invention.

FIG. 40 shows a plurality of kiosks mounted to a vertical surface of a counter top. More particularly, a counter includes a top horizontal surface 4002, a front vertical surface 4004 extending downwardly from the top surface 4002, and a ledge 4006 overhanging 4010 the front surface 4004. A kiosk 4011 includes a first segment 4012 including a display and a second segment 4014 joined at a junction 4016. The junction 4016 is spaced apart from the top surface 4002 by a distance 4018, for example in the range of zero to ten inches, and preferably about one to four inches. As illustrated, the second segment 4014 includes a slot 4015 for providing a receipt, and the first segment 4012 includes a payment module 4020. The first segment extends rearward from the ledge 4006 and overhangs the top surface 4002. The first segment 4012 forms an angle (typically acute) with respect to the top surface 4002 in the range of 0 to 90 degrees, and preferably about 30-60 degrees, and most preferably about 45 degrees. The kiosk 4011 may be configured in landscape or portrait mode, and may include blades or a ring.

Figure 41:
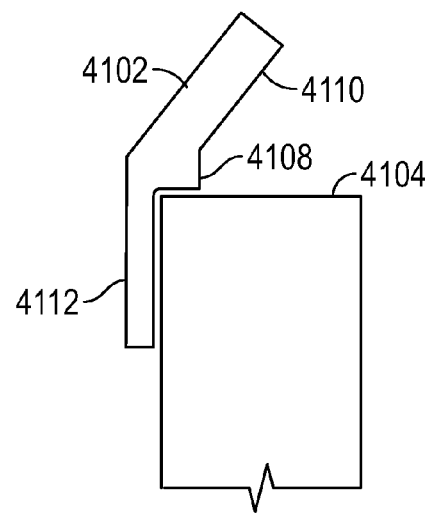

An alternative embodiment shown in FIG. 41 includes a kiosk 412 mounted to a counter of the type including a top surface 4104 and a font surface 4106. The kiosk 4102 includes a first segment 4110 which at least partially overhangs the top surface 4104, a second segment 4112 which extends along a portion of the front surface 4106, and an intermediary support structure 4108. The kiosk may be secured to the top surface 4104, the front surface 4106, or both.

Figure 42:
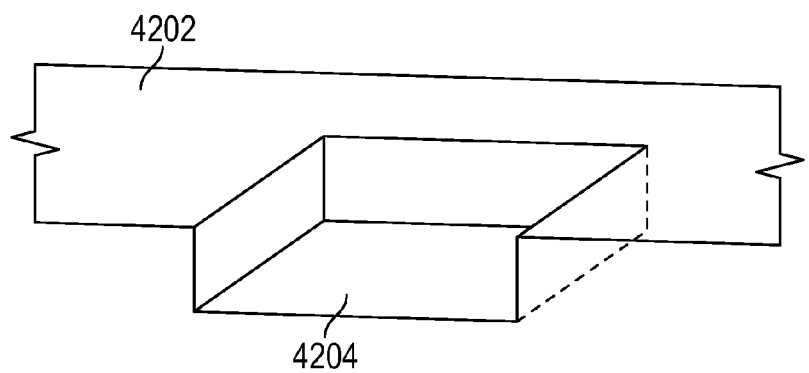
Figure 43:
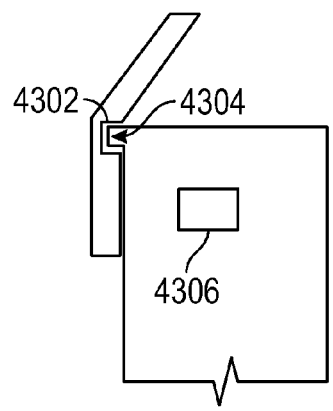

FIG. 42 shows a counter 4202 having a recess or cutout 4204 formed at the junction of the top and front counter surfaces for receiving a portion of a kiosk (not shown). FIG. 43 shows a kiosk having a recess 4302 configured to receive a lip or ledge 4304 of a counter. The counter also includes an internal region 4306 for housing components which may be wirelessly or otherwise connected to the kiosk, to allow for a thin kiosk profile without compromising performance.

Figure 44:
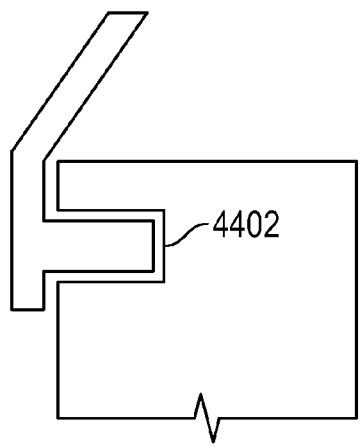

FIG. 44 shows a counter having a recess 4402 which is spaced apart from the top counter surface, for receiving either a portion of the kiosk, components associated with the kiosk, or both.

Figure 45:
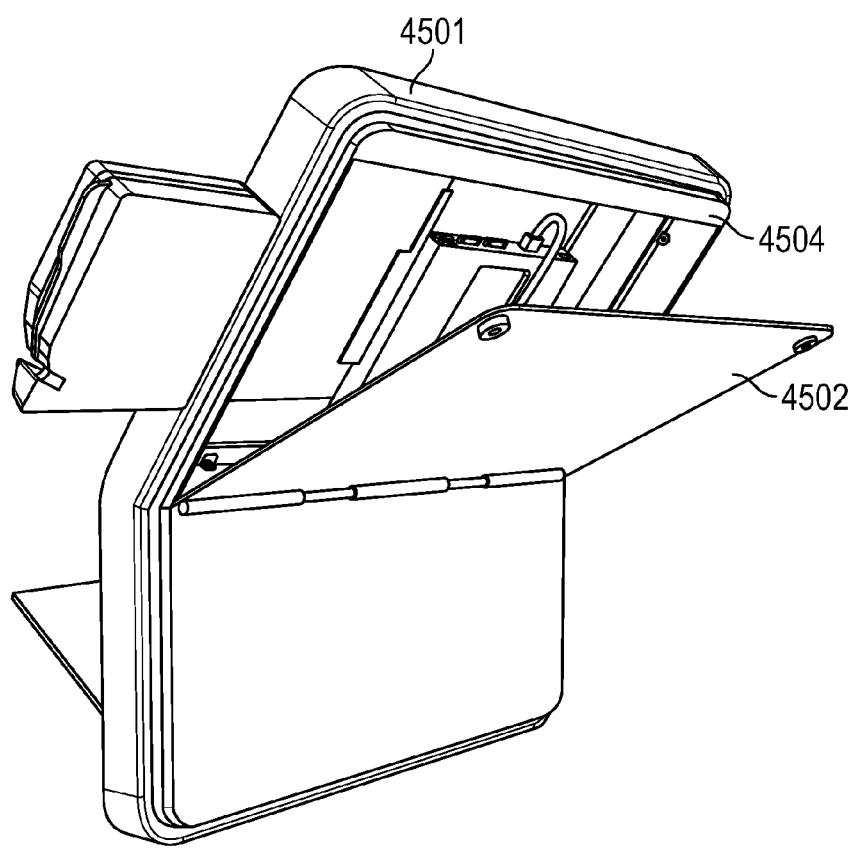
Figure 46:
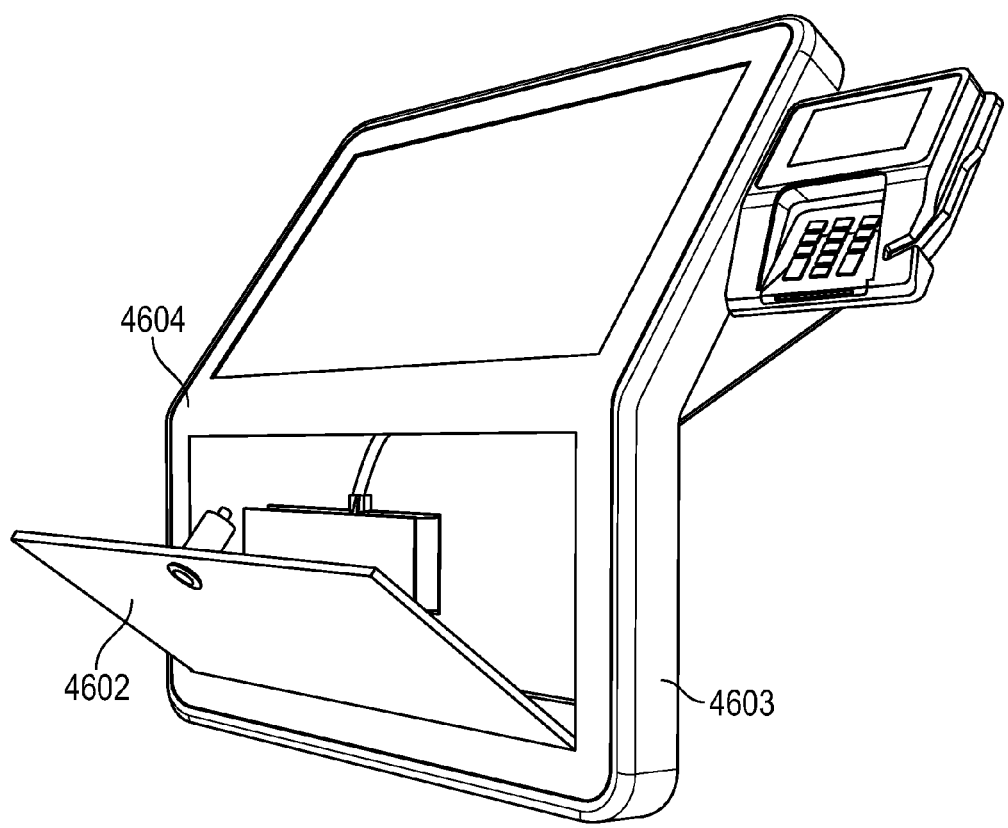
Figure 47:
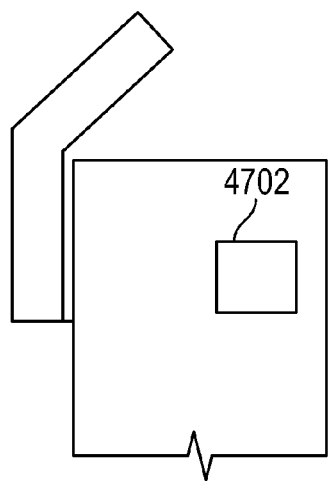

FIG. 45 shows a kiosk having a component door 4502 disposed on the rear surface of a first segment 4501 for providing access to a component region 4504 within the upper portion of the kiosk. FIG. 46 includes a component door 4602 on the front of a second segment 4603 for providing access to a component region 4604 within the lower portion of the kiosk. FIG. 47 shows a component cavity 4702 disposed in the interior of the counter remote from the kiosk. The kiosk may communicate wirelessly or via a wired connection with the remote components.

Figure 48:
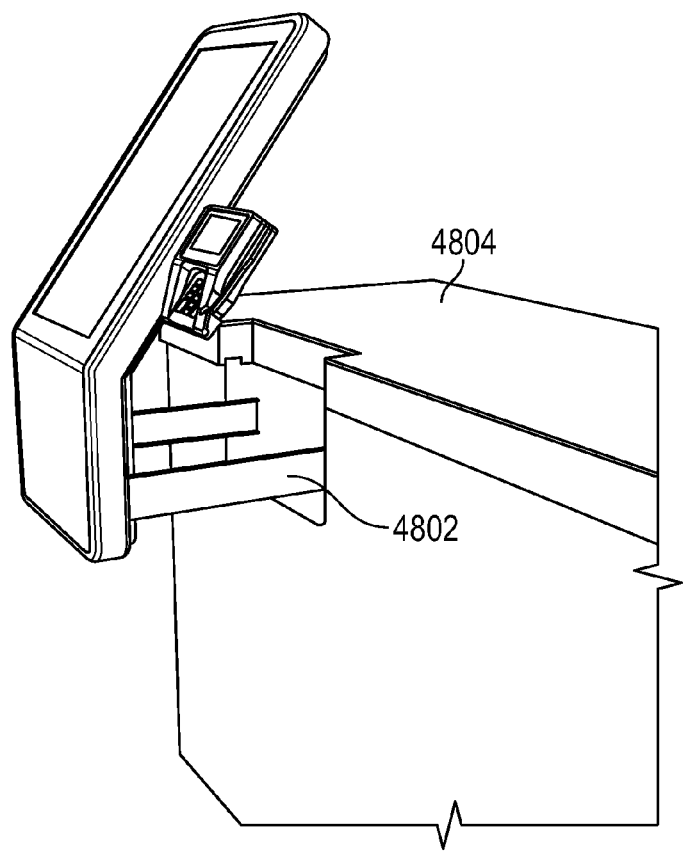

FIG. 48 depicts an alternate embodiment including a slide mechanism 4802 which allows the kiosk to pull away from the counter, providing access to the back of the kiosk, an internal cavity 4804, or both.

Figure 49:
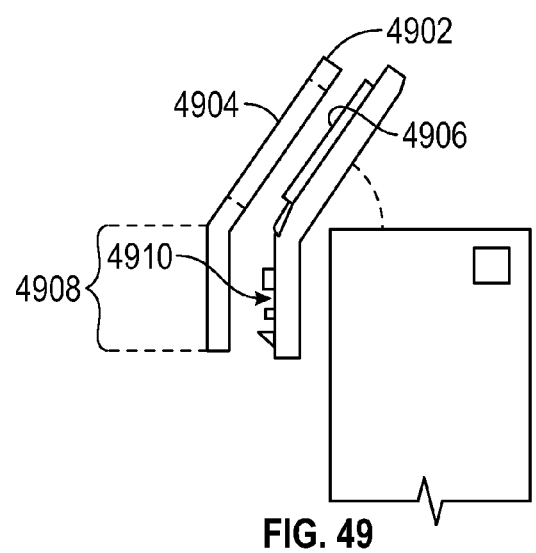

FIG. 49 illustrates a face frame 4902 having an opening 4904 corresponding to the shape of a newly installed display 4906. In addition, the kiosk may have a replaceable component door 4908 configured to accommodate reconfigured components 4910.

Figure 50:
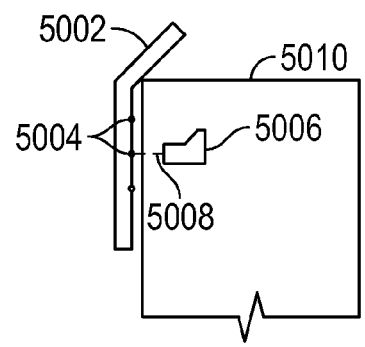

FIG. 50 illustrates a kiosk 5002 having one or more plug-ins 5004 for establishing communication with one or more corresponding components 5006 configured for storage within the counter, for example via a connector 5008.

Figure 51:
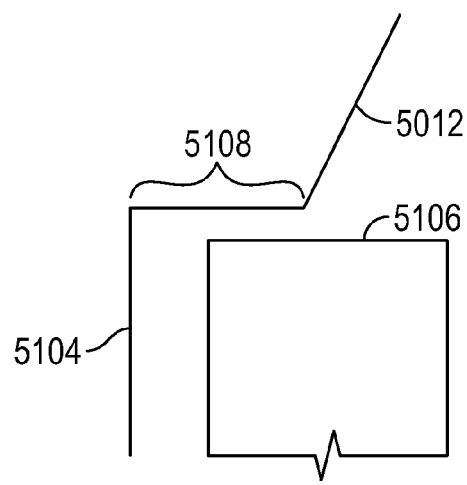

FIG. 51 schematically illustrates a counter 5106 for mounting a kiosk having a first segment 5102, a second segment 5104, and an intermediate segment 5108 which may support a keyboard, an auxiliary display for advertising, or various other components. In various embodiments, the ratio of the length $L_1$ of the first segment 5102 to the length $L_2$ of the second segment 5104 may range from 5:1 to 1:5, and preferably about 2:1 to 1:2, and most preferably about 1:1.

Figure 52:
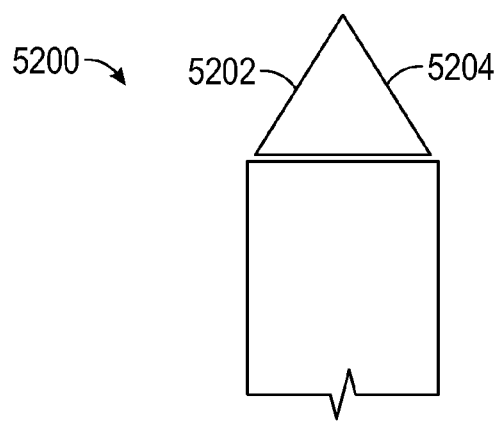

FIG. 52 is a dual sided counter top kiosk 5200 including a first screen 5202 for use by a customer, and a second screen 5204 for use by an customer service employee. The triangular embodiment shown in FIG. 52 is referred to as a digital personal interaction experience kiosk.

The present invention further contemplates retrofitting a countertop to accommodate the foregoing embodiments.

An improved kiosk is thus provided which includes: a replaceable component door configured to accommodate at least one of a printer, scanner, credit card payment device, keypad, speaker, and microphone; a display chassis configured to accommodate at least two display sizes; a PC cartridge configured to receive least two PC configurations; and interchangeable side blades.

A method is thus provided for changing a display in a kiosk of the type including a sub-chassis and a removably attached face plate having a substantially rectangular opening, the method including: removing the face plate from the sub-chassis; removing a first bracket configured to secure a first display, having a first perimeter, to the sub-chassis; removing the first display from the sub-chassis; and installing a second display, having a second perimeter, into the sub-chassis using a second bracket different from the first bracket; wherein the first perimeter is different than from the second perimeter, and further wherein both the first and second perimeters fit within the substantially rectangular opening.

A method is also provided for updating a kiosk, the method including: removing a first face plate, having a first opening, from a sub-chassis; removing a first display, having a first size corresponding to the first opening, from the sub-chassis; securing a second display, having a second size, to the sub-chassis; and attaching a second face plate to the sub-chassis, the second face plate having a second opening corresponding to the second display.

In an embodiment, removing the first display comprises removing a first bracket configured to secure the first display within the sub-chassis; and securing the second display comprises installing a second bracket different from the first bracket between the sub-chassis and the second display.

In an embodiment, attaching the second face plate comprises: aligning the second opening with the second display; and hooking a top lip of the second face plate over a top edge of the sub-chassis.

A method is also provided for maintaining a kiosk of the type including a display and a chassis configured to house a portion of a user interactive component therewithin, the method including: removing a first component door from the chassis, the first component door having a first configuration adapted to accommodate a first user interactive component; removing the first user interactive component; replacing the first user interactive component with a second user interactive component; and installing a second component door onto the chassis, the second component door having a second configuration adapted to accommodate the second user interactive component.

In an embodiment, the first and second user interactive components perform the same function but differ in at least one of size, shape, and location within the chassis.

In an embodiment, the first and second user interactive components each comprise one of a printer, keypad, scanner, and payment module.

A system is also provided for displaying products and processing customer orders for the products in a retail environment, the system comprising: digital signage having one or more bevel-less displays joined together and surrounded by a uni-enclosure and a circumferential ring; a counter mounted kiosk having a first segment configured to float above the counter surface and a second segment extending downwardly from the first segment, wherein the first segment houses a display and includes a payment module, and the second segment includes at least one of the following components: a printer, a panic button, and a scanner; a free standing kiosk including a touch screen display; and at least one table having a touch screen display mounted in the surface of the table; wherein the counter mounted kiosk, the free standing kiosk, and the table further comprise at least one of a ring and a blade.

A blade is also provided for use with a kiosk of the type comprising a substantially rectangular cabinet having a front side including a display, a back side, and an edge spanning the front and back sides. In an embodiment, the blade includes: an elongated strip extending along at least a portion of the cabinet edge and having, in cross section, a first end, a second end, and a middle portion between the first and second ends; wherein the first end is configured to contact the front side, the second end is configured to contact the back side, and the middle portion is spaced apart from the edge.

In an embodiment, the blade further includes a plurality of fastener assemblies configured to releasably secure the blade to the edge, and each fastener assembly may comprise a stud extending from a concave surface of the middle portion for insertion into a corresponding hole in the edge.

A sub-chassis is also provided for use in a kiosk, the sub-chassis comprising: a frame configured to house a display characterized by a display perimeter; and a substantially planar face plate having an opening corresponding to the display perimeter; wherein the face plate is configured to be overlaid onto the frame such that the display is visible through the opening.

In an embodiment, the frame and the face form a seam when the face plate is overlaid onto the frame, and the sub-chassis further includes a blade secured to the sub-chassis and extending along the seam.

In an embodiment, the blade comprises an inwardly facing c-channel enveloping respective side edges of the frame and the face plate.

In an embodiment, the frame further comprises a bracket assembly configured to selectively secure at least two different display sizes into the opening.

A kiosk chassis is also provided which includes: first and second oppositely disposed, vertically extending u-channel side members; a top region, a middle region, and a bottom region disposed between the first and second side members; and a cross brace disposed within the middle region and extending between the first and second side members, the cross brace comprising two intersecting members secured together.

In an embodiment, the kiosk chassis further includes: a display disposed within the top region; and a power supply disposed within the middle region between the two intersecting members.

In an embodiment, the kiosk chassis further includes first and second tapered tubular reinforcement members secured to the first and second side members, respectively, and disposed within the bottom region.

In an embodiment, the kiosk chassis further comprises a sub-chassis, including an electronic component, connected to a front side of the kiosk chassis; wherein the electronic component is disposed within the bottom region when the sub-chassis is in a closed position.

A kiosk configured for mounting to a counter is also provided, where the counter is of the type including a first portion having a horizontal surface and a second portion having a substantially vertical component. The kiosk includes: a first substantially rectangular segment extending above the horizontal surface and including a substantially planar touch screen display on a front surface of the first segment, an access panel disposed on a rear surface of the first segment, and a payment module configured to process payment for an item selected using the touch screen; and a second substantially rectangular segment extending downwardly from the first segment. The front surface of the first segment is inclined at a first angle with respect to the horizontal surface of the counter in the range of 10-80 degrees; and at least a portion of the horizontal surface is disposed between the first segment and the second segment.

In an embodiment, the first segment further comprises a back surface, and the front surface and back surface of the first segment are substantially parallel.

In an embodiment, the kiosk further comprises a continuous circumferential ring extending around the perimeter of the kiosk.

In an embodiment, the counter comprises a relief formed therein, and at least a portion of the kiosk is seated within the relief.

In various embodiments, either the first segment, the second segment, or both segments may be mounted to the counter.

In an embodiment, the first segment is connected to the second segment.

In an embodiment, the first segment includes a flat, horizontal bottom portion configured to engage the horizontal surface of the counter.

In an embodiment, the counter comprises an eave overhanging the second portion of the counter lip, and the kiosk comprises a recess configured to receive a portion of the eave.

In an embodiment, the second segment of the kiosk comprises a component cavity configured to house at least one user interactive component.

In an embodiment, the at least one user interactive component comprises one of a printer, scanner, payment module, and key pad.

In an embodiment, the counter further comprises an internal cavity configured to house a portion of at least one user interactive component.

In an embodiment, the second segment of the kiosk comprises a component cavity configured to house at least one user interactive component, and further wherein the component cavity is contiguous with the internal cavity.

In an embodiment, the kiosk further comprises a payment module integrated into the touch screen.

In an embodiment, the kiosk further comprises a payment module extending from the first segment.

In an embodiment, the second segment of the kiosk is substantially parallel to the second portion of the counter.

In an embodiment, the second segment comprises a removable access panel on a back side thereof.

A kiosk system is also provided which includes a plurality of kiosks configured to be distributed along and integrated into a counter of the type having a horizontal counter surface and a supporting section extending downwardly relative to a front edge of the horizontal surface forming in internal region between the horizontal surface and the supporting section. Each kiosk may include: a first segment extending above the horizontal surface and including an interactive display on a front surface of the first segment; a second segment extending downwardly from the first segment; and a third segment extending into a portion of the internal region, the third segment housing a user interactive component.

In an embodiment, a portion of the first segment intersects a portion of the second segment along a horizontal line, wherein the horizontal line is disposed one of i) above the horizontal surface; ii) substantially co-planar with the horizontal surface; and iii) below the horizontal the horizontal surface.

In an embodiment, each kiosk further comprises a printer configured to print a receipt, wherein the printer is connected to one of the first segment and the second segment.

In an embodiment, each kiosk further comprises a first processor associated with the display, and a payment module having a second processor.

In an embodiment, the kiosk system further includes a printer remote from and shared by each of the plurality of kiosks.

As used herein, the word "exemplary" means "serving as an example, instance, or illustration." Any implementation described herein as "exemplary" is not necessarily to be construed as preferred or advantageous over other implementations, nor is it intended to be construed as a model that must be literally duplicated.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

The invention claimed is:

1. A kiosk configured for mounting to a counter, the counter being of the type including a first portion having a horizontal surface and a second portion having a substantially vertical component, the kiosk comprising:
 a first substantially rectangular segment extending above the horizontal surface and including a substantially planar touch screen display on a front surface of the first segment, an access panel disposed on a rear surface of the first segment, and a payment module configured to process payment for an item selected using the touch screen; and
 a second substantially rectangular segment extending downwardly from the first segment;
 wherein:
 the front surface of the first segment is inclined at a first angle with respect to the horizontal surface of the counter in the range of 10-80 degrees; and
 at least a portion of the horizontal surface is disposed between the first segment and the second segment.

2. The kiosk chassis of claim 1, further comprising a sub-chassis, including an electronic component, connected to a front side of the kiosk chassis;
 wherein the electronic component is disposed within the bottom region when the sub-chassis is in a closed position.

3. The kiosk of claim 1, wherein the first segment further comprises a back surface, and the front surface and back surface of the first segment are substantially parallel.

4. The kiosk of claim 1, further comprising a continuous circumferential ring extending around the perimeter of the kiosk.

5. The kiosk of claim 1, wherein the counter comprises a relief formed therein, and at least a portion of the kiosk is seated within the relief.

6. The kiosk of claim 1, wherein the first segment is mounted to the counter.

7. The kiosk of claim 1, wherein the second segment is mounted to the counter.

8. The kiosk of claim 1, wherein the first segment is connected to the second segment.

9. The kiosk of claim 1, wherein the first segment includes a flat, horizontal bottom portion configured to engage the horizontal surface of the counter.

10. The kiosk of claim 1, wherein the counter comprises an eave overhanging the second portion of the counter lip, and the kiosk comprises a recess configured to receive a portion of the eave.

* * * * *